US012710538B2

(12) United States Patent
Song et al.

(10) Patent No.: US 12,710,538 B2
(45) Date of Patent: Aug. 18, 2026

(54) ELECTRONIC DEVICE FOR OBTAINING DISTANCE INFORMATION AND METHOD FOR CONTROLLING THE SAME

(71) Applicant: SAMSUNG ELECTRONICS CO., LTD., Suwon-si (KR)

(72) Inventors: Doukyoung Song, Suwon-si (KR); Jina Jeon, Suwon-si (KR); Chulkwi Kim, Suwon-si (KR); Jongmin Yoon, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 859 days.

(21) Appl. No.: 18/157,087

(22) Filed: Jan. 20, 2023

(65) Prior Publication Data

US 2023/0236321 A1 Jul. 27, 2023

Related U.S. Application Data

(63) Continuation of application No. PCT/KR2023/000074, filed on Jan. 3, 2023.

(30) Foreign Application Priority Data

Jan. 24, 2022 (KR) ........................ 10-2022-0010167

(51) Int. Cl.
*G01S 17/89* (2020.01)
*H04N 23/60* (2023.01)
(Continued)

(52) U.S. Cl.
CPC ............ *G01S 17/89* (2013.01); *H04N 23/60* (2023.01); *H04N 25/77* (2023.01);
(Continued)

(58) Field of Classification Search
None
See application file for complete search history.

(56) References Cited

U.S. PATENT DOCUMENTS 10,345,447 B1 7/2019 Hicks
10,771,669 B1 9/2020 Balasubramanian et al.
(Continued)

FOREIGN PATENT DOCUMENTS

CN 112346073 A 2/2021
CN 113034567 A 6/2021
(Continued)

OTHER PUBLICATIONS

The extended European search report for EP Application No. 23743386.7 mailed on Feb. 18, 2025.
(Continued)

*Primary Examiner* — Hovhannes Baghdasaryan
(74) *Attorney, Agent, or Firm* — CANTOR COLBURN LLP

(57) ABSTRACT

An electronic device includes an image sensor, a light transmission module including light transmission elements, a light reception module including light reception elements, and a processor operatively connected with the image sensor, the light transmission module, and the light reception module. The processor obtains first distance information through the light transmission elements and the light reception elements, obtains a first frame and a second frame through the image sensor, obtains area information related to an area of the second frame, in which a difference in pixel value from the first frame is a set value or more, through the image sensor, activates a light transmission element corresponding to the area among the light transmission elements based on the area information, and obtains second distance information about the area through the activated light trans-
(Continued)

Start
Obtain first distance information through multiple Tx elements included in light source and multiple Rx elements included in detector — 510
Obtain first frame and second frame through image sensor — 520
Obtain area information about area of second frame, in which difference in pixel value from first frame is set value or more through image sensor — 530
Activate Tx element corresponding to area based on area information — 540
Obtain second distance information about area through activated Tx element and Rx element — 550
End mission element and at least one of the light reception elements.

20 Claims, 13 Drawing Sheets

(51) Int. Cl.
*H04N 25/77* (2023.01)
*G02B 27/01* (2006.01)

(52) U.S. Cl.
CPC .. *G02B 27/0172* (2013.01); *G02B 2027/0178* (2013.01); *G02B 2207/101* (2013.01)

(56) References Cited

U.S. PATENT DOCUMENTS

| | | | |
|---|---|---|---|
| 2017/0176579 | A1 | 6/2017 | Niclass et al. |
| 2018/0143301 | A1 | 5/2018 | Badoni et al. |
| 2018/0156609 | A1* | 6/2018 | Kimura .................. G06V 20/58 |
| 2018/0196139 | A1 | 7/2018 | Brown et al. |
| 2018/0249143 | A1 | 8/2018 | Calpe Maravilla et al. |
| 2020/0033456 | A1 | 1/2020 | Wang et al. |
| 2020/0057151 | A1 | 2/2020 | Finkelstein et al. |
| 2020/0195875 | A1 | 6/2020 | Berkovich et al. |
| 2020/0258278 | A1 | 8/2020 | Mirhosseini et al. |
| 2020/0349728 | A1 | 11/2020 | Bitan et al. |
| 2020/0402249 | A1 | 12/2020 | Kim |
| 2021/0258457 | A1 | 8/2021 | Akkaya et al. |
| 2021/0325541 | A1 | 10/2021 | Kim et al. |

FOREIGN PATENT DOCUMENTS

| | | | |
|---|---|---|---|
| KR | 20190128047 | A | 11/2019 |
| KR | 20200011351 | A | 2/2020 |
| KR | 20200127849 | A | 11/2020 |
| KR | 102244038 | B1 | 4/2021 |
| KR | 102282800 | B1 | 7/2021 |
| KR | 20210102329 | A | 8/2021 |
| WO | 2021159226 | A1 | 8/2021 |

OTHER PUBLICATIONS

International Search Report mailed Apr. 12, 2023 for PCT/KR2023/000074.

* cited by examiner

ELECTRONIC DEVICE FOR OBTAINING DISTANCE INFORMATION AND METHOD FOR CONTROLLING THE SAME

CROSS-REFERENCE TO RELATED APPLICATIONS

This application is a continuation of International Application No. PCT/KR2023/000074, filed Jan. 3, 2023, designating the United States, in the Korean Intellectual Property Receiving Office, and claiming priority to KR Patent Application No. 10-2022-0010167, filed Jan. 24, 2022, the disclosures of which are all hereby incorporated by reference herein in their entireties.

BACKGROUND

1. Field

Various embodiments of the disclosure relate to an electronic device for obtaining distance information and a method for controlling the same.

2. Description of Related Art

A three-dimensional ("3D") light detection and ranging ("LiDAR") sensor for capturing a stereoscopic image may measure a distance of an object using direct time of flight ("TOF").

The LiDAR sensor may measure a time duration taken from the emission of a predetermined wavelength (850 nanometer (nm) to 940 nm) of light from a light source (Tx element) to the arrival at the direct ToF ("dTOF"), which corresponds to a detector, of the light reflected by the object, obtaining distance information between the electronic device and the object.

Such a LiDAR sensor may be used as a sensor for an autonomous vehicle or a motion capture sensor of a user interface, be included in a wearable electronic device, such as a head-mounted device ("HMD") or a smart watch (or band), and be used to provide immersive augmented reality ("AR") or virtual reality ("VR") images by outputting independent images to both eyes of the user based on the distance information obtained through the LiDAR sensor. Further, the LiDAR sensor may be used in a depth camera for detecting depth information in an industrial site and a military laser radar, that is, laser detection and ranging ("LADAR"), and may also be used as a range sensor for robot navigation.

The mobile light detection and ranging ("LiDAR") system controls power consumption based on the resolution. The resolution-based power consumption control method divides all light transmission elements and light reception elements into a plurality of element groups of low-resolution light transmission elements and light reception elements and controls the operation of the light transmission elements and light reception elements operated by controlling each element group.

SUMMARY

However, this technique operates even light transmission elements and light reception elements, which do not require new distance information due to lack of a movement of the object as the light transmission elements and light reception elements included in each element group are arrayed in a low resolution in the overall area, causing power waste.

According to various embodiments of the disclosure, there may be provided an electronic device and a method for controlling the same, which obtain new distance information only for areas where there is an object movement.

The disclosure is not limited to the foregoing embodiments but various modifications or changes may rather be made thereto without departing from the spirit and scope of the disclosure.

According to various embodiments, an electronic device may include an image sensor, a light transmission module including a plurality of light transmission elements, a light reception module including a plurality of light reception elements, and at least one processor operatively connected with the image sensor, the light transmission module, and the light reception module. The at least one processor may obtain first distance information through the plurality of light transmission elements and the plurality of light reception elements, obtain a first frame and a second frame, obtain area information related to an area of the second frame, in which a difference in pixel value from the first frame is a set value or more, through the image sensor, activate a light transmission element corresponding to the area among the plurality of light transmission elements based on the area information, and obtain second distance information about the area through the activated light transmission element and the plurality of light reception elements.

In an embodiment, a method for controlling an electronic device may include obtaining first distance information through a plurality of light transmission elements included in a light transmission module and a plurality of light reception elements included in a light reception module, obtaining a first frame and a second frame through an image sensor, obtaining area information related to an area of the second frame, in which a difference in pixel value from the first frame is a set value or more, through the image sensor, activating a light transmission element corresponding to the area among the plurality of light transmission elements based on the area information, and obtaining second distance information about the area through the activated light transmission element and the plurality of light reception elements.

According to various embodiments of the disclosure, the electronic device obtains new distance information only for areas where there is an object movement, reducing power consumption.

Further, according to various embodiments of the disclosure, the electronic device may obtain the position and distance information about the object by tracking the movement of the object.

Further, according to various embodiments of the disclosure, the electronic device may obtain distance information even when the object is disposed outside an area where a distance measurement is possible.

DETAILED DESCRIPTION

Figure 1:
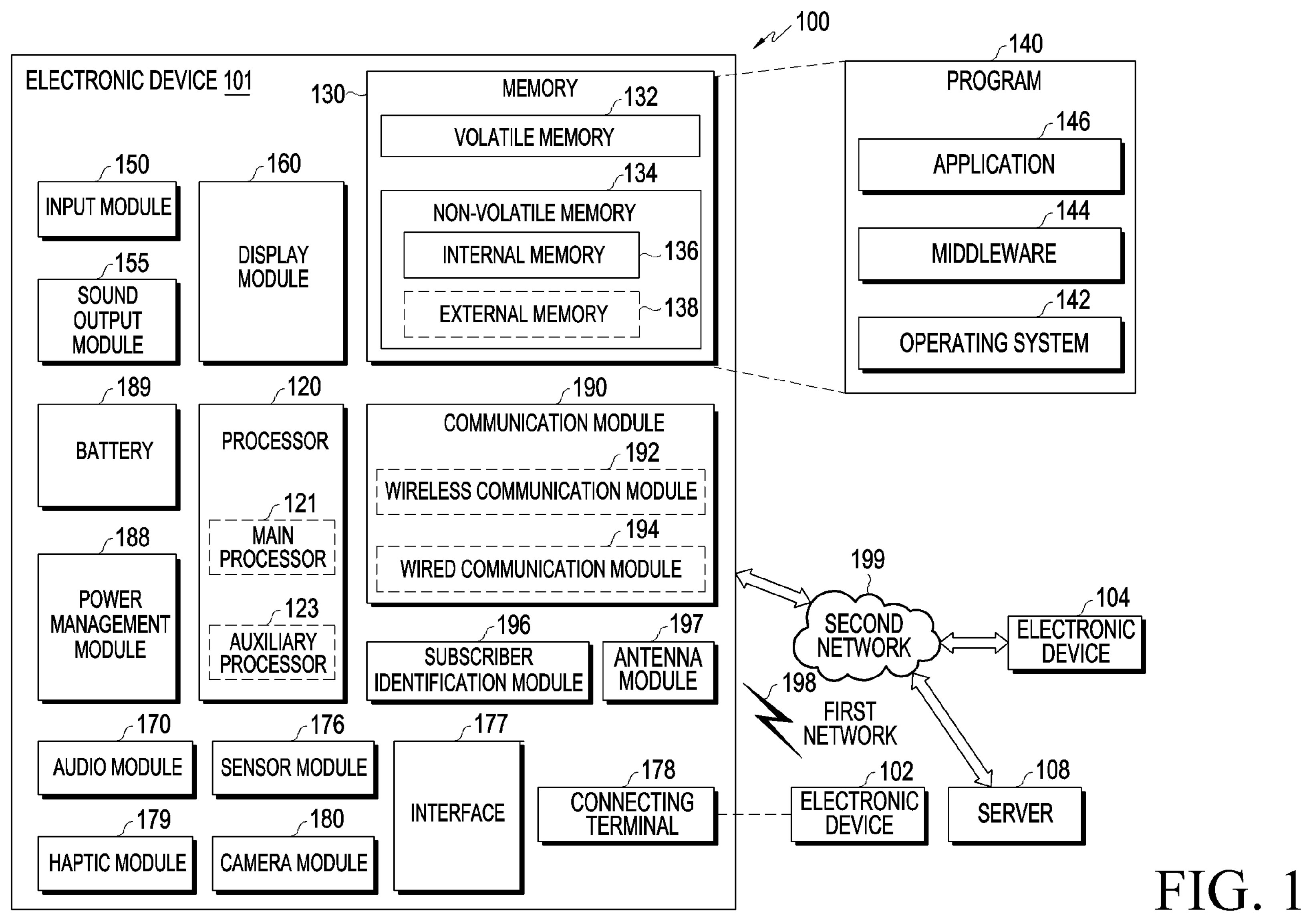
FIG. 1 is a block diagram illustrating an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
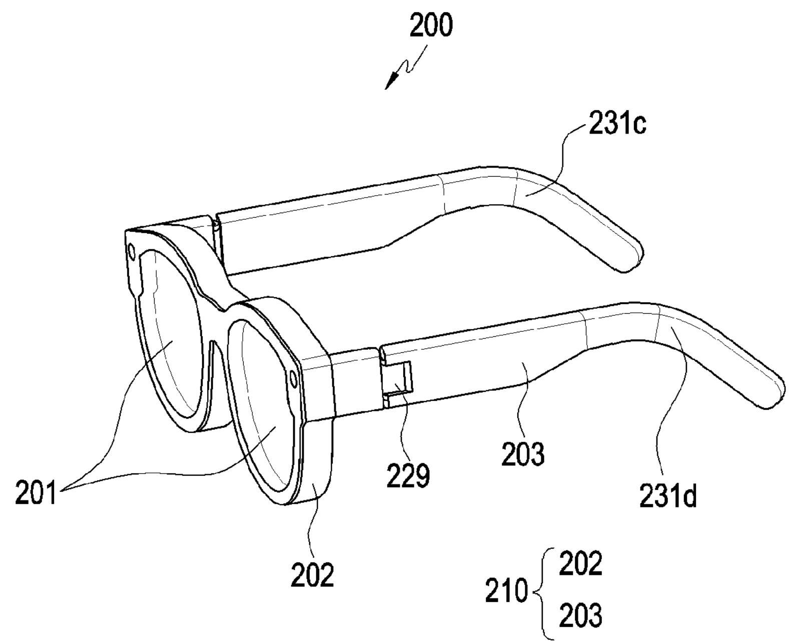
FIG. 2 is a perspective view illustrating an embodiment of a wearable electronic device according to the disclosure.

FIG. 2 is a perspective view illustrating an embodiment of a wearable electronic device according to the disclosure.

Referring to FIG. 2, the wearable electronic device 200 (hereinafter also referred to as an electronic device 200) may be a glasses-type electronic device, and the user may visually recognize surrounding objects or environment while wearing the electronic device 200. In an embodiment, the electronic device 200 may be a head-mounted device ("HMD") or smart glasses capable of providing images directly in front of the user's eyes, for example. The configuration of the electronic device 200 of FIG. 2 may be identical in whole or part to the configuration of the electronic device 101 of FIG. 1.

According to various embodiments, the electronic device 200 may include a housing that forms the exterior of the electronic device 200. The housing 210 may provide a space in which components of the electronic device 200 may be disposed. In an embodiment, the housing 210 may include a lens frame 202 and at least one wearing member 203, for example.

According to various embodiments, the electronic device 200 may include a display member 201 capable of providing the user with visual information. In an embodiment, the display member 201 may include a module equipped with a lens, a display, a waveguide, and/or a touch circuit, for example. In an embodiment, the display member 201 may be transparent or translucent. In an embodiment, the display member 201 may include a semi-transparent glass or a window member the light transmittance of which may be adjusted as the coloring concentration is adjusted. In an embodiment, a pair of display members 201 may be provided and disposed to correspond to the user's left and right eyes, respectively, with the electronic device 200 worn on the user's body.

According to various embodiments, the lens frame 202 may receive at least a portion of the display member 201. In an embodiment, the lens frame 202 may surround at least a portion of the display member 201, for example. In an embodiment, the lens frame 202 may position at least one of the display members 201 to correspond to the user's eye. In an embodiment, the lens frame 202 may be the rim of a normal eyeglass structure. In an embodiment, the lens frame 202 may include at least one closed loop surrounding the display members 201.

According to various embodiments, the wearing members 203 may extend from the lens frame 202. In an embodiment, the wearing members 203 may extend from ends of the lens frame 202 and, together with the lens frame 202, may be supported and/or disposed on a part (e.g., ears) of the user's body, for example. In an embodiment, the wearing members 203 may be rotatably coupled to the lens frame 202 through hinge structures 229. In an embodiment, the wearing member 203 may include an inner side surface 231*c* which faces the user's body and an outer side surface 231*d* opposite to the inner side surface.

According to various embodiments, the electronic device 200 may include the hinge structures 229 which folds the wearing members 203 on the lens frame 202. The hinge structure 229 may be disposed between the lens frame 202 and the wearing member 203. While the electronic device 200 is not worn, the user may fold the wearing members 203 on the lens frame 202 to carry or store the electronic device.

Figure 3:
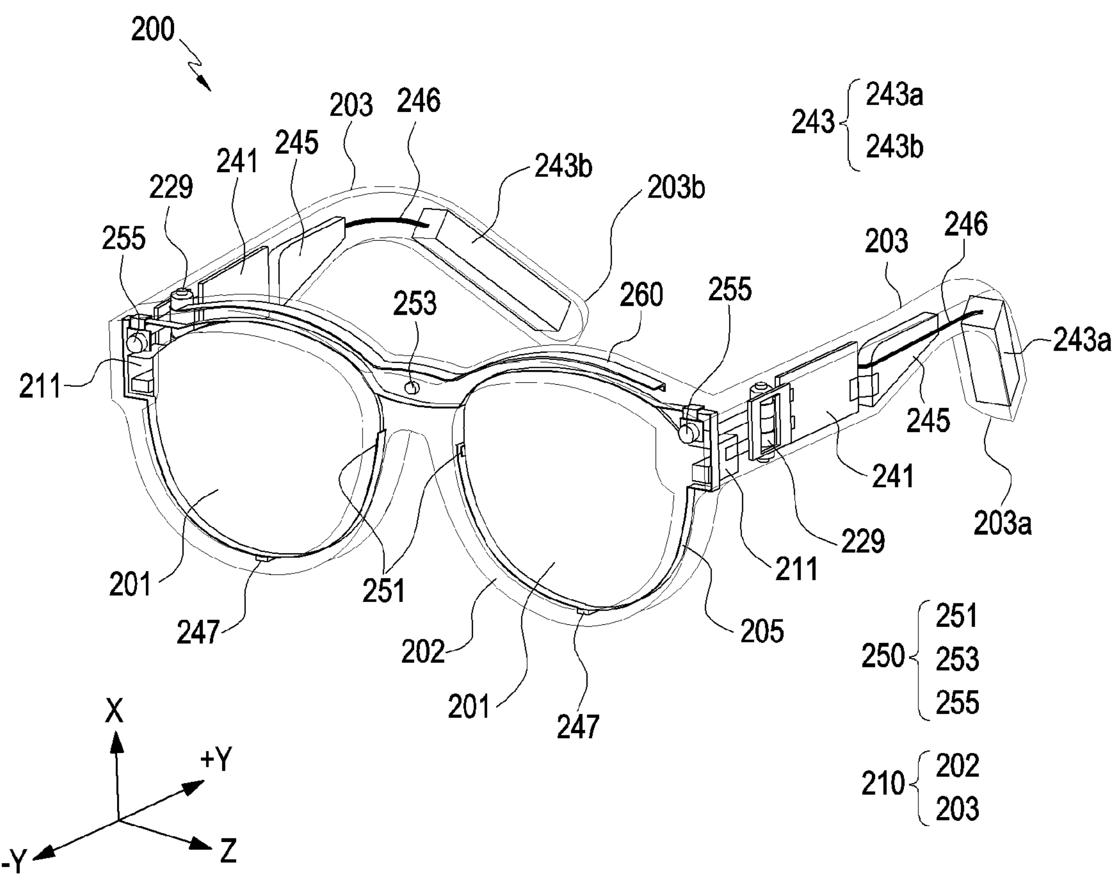
FIG. 3 is a perspective view illustrating an embodiment of an internal configuration of a wearable electronic device according to the disclosure.
Figure 4:
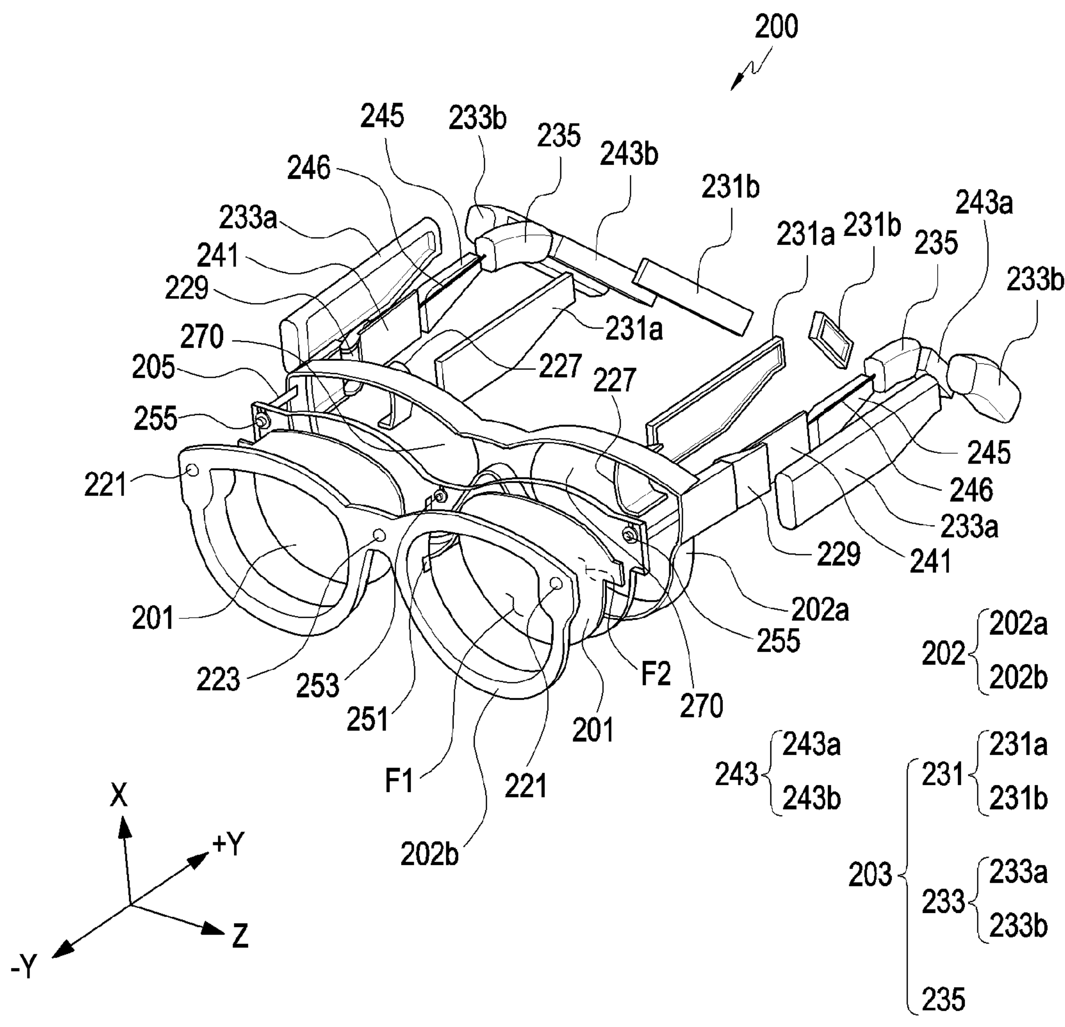
FIG. 4 is an exploded perspective view illustrating an embodiment of a wearable electronic device according to the disclosure.

FIG. 3 is a perspective view illustrating an embodiment of an internal configuration of a wearable electronic device according to the disclosure. FIG. 4 is an exploded perspective view illustrating an embodiment of a wearable electronic device according to the disclosure.

Referring to FIGS. 3 and 4, an electronic device 200 may include components received in the housing 210 (e.g., at least one circuit board 241 (e.g., PCB, printed board assembly ("PBA"), flexible PCB, or rigid-flexible PCB ("RFPCB")), at least one battery 243, at least one speaker module 245, at least one power transfer structure 246, and a camera module 250). The configuration of the housing 210 of FIG. 3 may be identical in whole or part to the configuration of the display members 201, the lens frame 202, the wearing members 203, and the hinge structures 229 of FIG. 2.

According to various embodiments, the electronic device 200 may obtain and/or recognize a visual image regarding an object or environment in the direction (e.g., −Y direction) in which the electronic device 200 faces or the direction in which the user gazes, using the camera module 250 (e.g., the camera module 180 of FIG. 1) and may receive information regarding the object or environment from an external electronic device (e.g., the electronic device 102 or 104 or the server 108 of FIG. 1) through a network (e.g., the first network 198 or second network 199 of FIG. 1). In another embodiment, the electronic device 200 may provide the received object-related or environment-related information, in the form of an audio or visual form, to the user. The electronic device 200 may provide the received object-related or environment-related information, in a visual form, to the user through the display members 201, using the display module (e.g., the display module 160 of FIG. 1). In an embodiment, the electronic device 200 may implement augmented reality ("AR") by implementing the object-related or environment-related information in a visual form and combining it with an actual image of the user's surrounding environment, for example.

According to various embodiments, the display member 201 may include a first surface F1 facing in a direction (e.g., −y direction) in which external light is incident and a second surface F2 facing in a direction (e.g., +y direction) opposite to the first surface F1. With the user wearing the electronic device 200, at least a portion of the light or image coming through the first surface F1 may be incident on the user's left eye and/or right eye through the second surface F2 of the display member 201 disposed to face the user's left eye and/or right eye.

According to various embodiments, the lens frame 202 may include at least two or more frames. In an embodiment, the lens frame 202 may include a first frame 202*a* and a second frame 202*b*, for example. In an embodiment, when the user wears the electronic device 200, the first frame 202*a* may be a frame of the portion facing the user's face, and the second frame 202*b* may be a portion of the lens frame 202 spaced from the first frame 202*a* in the gazing direction (e.g., −Y direction) in which the user gazes.

According to various embodiments, the light output module 211 may provide an image and/or video to the user. In an embodiment, the light output module 211 may include a display panel (not shown) capable of outputting images and a lens (not shown) corresponding to the user's eye and guiding images to the display member 201, for example. In an embodiment, the user may obtain the image output from the display panel of the light output module 211 through the lens of the light output module 211, for example. According to various embodiments, the light output module 211 may include a device which displays various information. In an embodiment, the light output module 211 may include at least one of a liquid crystal display ("LCD"), a digital mirror device ("DMD"), a liquid crystal on silicon ("LCoS"), or an organic light-emitting diode ("OLED"), or a micro light-emitting diode ("micro LED"), for example. In an embodiment, when the light output module 211 and/or the display member 201 includes one of an LCD, a DMD, or an LCoS, the electronic device 200 may include a light output module 211 and/or a light source emitting light to the display area of the display member 201. In another embodiment, when the light output module 211 and/or the display member 201 may include OLEDs or micro LEDs, the electronic device 200 may provide virtual images to the user without a separate light source.

According to various embodiments, at least a portion of the light output module 211 may be disposed in the housing 210. In an embodiment, the light output module 211 may be disposed in the wearing member 203 or the lens frame 202 to correspond to each of the user's right eye and left eye, for example. In an embodiment, the light output module 211 may be connected to the display member 201 and may provide images to the user through the display member 201.

According to various embodiments, the circuit board 241 may include components for driving the electronic device 200. In an embodiment, the circuit board 241 may include at least one integrated circuit chip. Further, at least one of the processor 120, the memory 130, the power management module 188, or the communication module 190 of FIG. 1 may be provided in the integrated circuit chip, for example. In an embodiment, a circuit board 241 may be disposed in the wearing member 203 of the housing 210. In an embodiment, the circuit board 241 may be electrically connected to the battery 243 through the power transfer structure 246. In an embodiment, the circuit board 241 may be connected to the flexible PCB 205 and may transfer electrical signals to the electronic components (e.g., the light output module 211, the camera module 250, and the light-emitting unit) of the electronic device through the flexible PCB 205. In an embodiment, the circuit board 241 may be a circuit board including an interposer.

According to various embodiments, the flexible PCB 205 may extend from the circuit board 241 through the hinge structure 229 to the inside of the lens frame 202 and may be disposed in at least a portion of the inside of the lens frame 202 around the display member 201.

According to various embodiments, the battery 243 (e.g., the battery 189 of FIG. 1) may be connected with components (e.g., the light output module 211, the circuit board 241, and the speaker module 245, the microphone module 247, and the camera module 250) of the electronic device 200 and may supply power to the components of the electronic device 200.

According to various embodiments, at least a portion of the battery 243 may be disposed in the wearing member 203. In an embodiment, batteries 243 may be disposed in ends 203*a* and 203*b* of the wearing members 203. In an embodiment, the batteries 243 may include a first battery 243*a* disposed in a first end 203*a* of the wearing member 203 and a second battery 243*b* disposed in a second end 203*b* of the wearing member 203, for example.

According to various embodiments, the speaker module 245 (e.g., the audio module 170 or the sound output module 155 of FIG. 1) may convert an electrical signal into sound. At least a portion of the speaker module 245 may be disposed in the wearing member 203 of the housing 210. In an embodiment, the speaker module 245 may be disposed in the wearing member 203 to correspond to the user's ear. In an embodiment, the speaker module 245 may be disposed between the circuit board 241 and the battery 243, for example.

According to various embodiments, the power transfer structure 246 may transfer the power from the battery 243 to an electronic component (e.g., the light output module 211) of the electronic device 200. In an embodiment, the power transfer structure 246 may be electrically connected to the battery 243 and/or the circuit board 241, and the circuit board 241 may transfer the power received through the power transfer structure 246 to the light output module 211, for example. In an embodiment, the power transfer structure 246 may be connected to the circuit board 241 through the speaker module 245. In an embodiment, when the electronic device 200 is viewed from a side (e.g., in the Z-axis direction), the power transfer structure 246 may at least partially overlap the speaker module 245, for example.

According to various embodiments, the power transfer structure 246 may be a component capable of transferring power. In an embodiment, the power transfer structure 246 may include a flexible PCB or wiring, for example. In an embodiment, the wiring may include a plurality of cables (not shown). In various embodiments, various changes may be made to the shape of the power transfer structure 246 considering the number and/or type of the cables, for example.

According to various embodiments, the microphone module 247 (e.g., the input module 150 and/or the audio module 170 of FIG. 1) may convert a sound into an electrical signal. In an embodiment, the microphone module 247 may be disposed in at least a portion of the lens frame 202. In an embodiment, at least one microphone module 247 may be disposed on a lower end (e.g., in the −X-axis direction) and/or on an upper end (e.g., in the +X-axis direction) of the electronic device 200, for example. According to various embodiments, the electronic device 200 may more clearly recognize the user's voice using voice information (e.g., sound) obtained by the at least one microphone module 247. In an embodiment, the electronic device 200 may distinguish the voice information from the ambient noise based on the obtained voice information and/or additional information (e.g., low-frequency vibration of the user's skin and bones), for example. In an embodiment, the electronic device 200 may clearly recognize the user's voice and may perform a function of reducing ambient noise (e.g., noise canceling), for example.

According to various embodiments, the camera module 250 may capture a still image and/or a video. The camera module 250 may include at least one of a lens, at least one image sensor, an ISP, or a flash. In an embodiment, the camera module 250 may be disposed in the lens frame 202 and may be disposed around the display member 201.

According to various embodiments, the camera module 250 may include at least one first camera module 251. In an embodiment, the first camera module 251 may capture the trajectory of the user's eye (e.g., a pupil) or gaze. In an embodiment, the first camera module 251 may capture the reflection pattern of the light emitted by the light-emitting unit to the user's eyes, for example. In an embodiment, the light-emitting unit may emit light in an IR band for tracking the trajectory of the gaze using the first camera module 251. In an embodiment, the light-emitting unit may include an IR LED, for example. In an embodiment, the processor (e.g., the processor 120 of FIG. 1) may adjust the position of the virtual image so that the virtual image projected on the display member 201 corresponds to the direction in which the user's pupil gazes. In an embodiment, the first camera module 251 may include a global shutter ("GS")-type camera. It is possible to track the trajectory of the user's eyes or gaze using a plurality of first camera modules 251 having the same specifications and performance.

According to various embodiments, the first camera module 251 may periodically or aperiodically transmit information related to the trajectory of the user's eye or gaze (e.g., trajectory information) to the processor (e.g., the processor 120 of FIG. 1). In another embodiment, when the first camera module 251 detects a change in the user's gaze based on the trajectory information (e.g., when the user's eyes move more than a reference value with the head disposed still), the first camera module 251 may transmit the trajectory information to the processor.

According to various embodiments, the camera modules 250 may include at least one second camera module 253. In an embodiment, the second camera module 253 may capture an external image. In an embodiment, the second camera module 253 may be a GS-type or rolling shutter ("RS")-type camera. In an embodiment, the second camera module 253 may capture an external image through the second optical hole 223 formed in the second frame 202*b*. In an embodiment, the second camera module 253 may include a high-resolution color camera, and it may be a high resolution ("HR") or photo video ("PV") camera. Further, the second camera module 253 may provide an auto-focus ("AF") function and an optical image stabilizer ("OIS") function, for example.

According to various embodiments (not shown), the electronic device 200 may include a flash (not shown) disposed adjacent to the second camera module 253. In an embodiment, the flash (not shown) may provide light for increasing brightness (e.g., illuminance) around the electronic device 200 when an external image is obtained by the second camera module 253, thereby reducing difficulty in obtaining an image due to the dark environment, the mixing of various light beams, and/or the reflection of light, for example.

According to various embodiments, the camera modules 250 may include at least one third camera module 255. In an embodiment, the third camera module 255 may capture the user's motion through a first optical hole 221 defined in the lens frame 202. In an embodiment, the third camera module 255 may capture the user's gesture (e.g., hand gesture), for example. Third camera modules 255 and/or first optical holes 221 may be disposed on or defined in two opposite sides of the lens frame 202 (e.g., the second frame 202*b*), e.g., formed or defined in two opposite ends of the lens frame 202 (e.g., the second frame 202*b*) with respect to the X direction. In an embodiment, the third camera module 255 may be a GS-type camera. In an embodiment, the third camera module 255 may be a camera supporting 3DoF (degrees of freedom) or 6DoF, which may provide position recognition and/or motion recognition in a 360-degree space (e.g., omni-directionally), for example. In an embodiment, the third camera modules 255 may be stereo cameras and may perform the functions of simultaneous localization and mapping ("SLAM") and user motion recognition using a plurality of GS-type cameras with the same specifications and performance. In an embodiment, the third camera module 255 may include an IR camera (e.g., a time of flight ("TOF") camera or a structured light camera). In an embodiment, the IR camera may be operated as at least a portion of a sensor module (e.g., the sensor module 176 of FIG. 1 or the light detection and ranging ("LiDAR") sensor 600 of FIG. 6) for detecting a distance from the subject, for example.

In an embodiment, at least one of the first camera module 251 or the third camera module 255 may be replaced with a sensor module (e.g., the sensor module 176 of FIG. 1) (e.g., LiDAR sensor). In an embodiment, the sensor module may include at least one of a vertical cavity surface emitting laser ("VCSEL"), an IR sensor, and/or a photodiode. In an embodiment, the photodiode may include a positive intrinsic negative ("PIN") photodiode or an avalanche photodiode ("APD"). The photodiode may be also referred to as a photo detector or a photo sensor, for example.

In an embodiment, at least one of the first camera module 251, the second camera module 253, and the third camera module 255 may include a plurality of camera modules (not shown), for example. In an embodiment, the second camera module 253 may include a plurality of lenses (e.g., wide-angle and telephoto lenses) and image sensors and may be disposed on one surface (e.g., a surface facing in the −Y axis) of the electronic device 200, for example. In an embodiment, the electronic device 200 may include a plurality of camera modules having different properties (e.g., angle of view) or functions and control to change the angle of view of the camera module based on the user's selection and/or trajectory information, for example. At least one of the plurality of camera modules may be a wide-angle camera and at least another of the plurality of camera modules may form a telephoto camera.

According to various embodiments, the processor (e.g., processor 120 of FIG. 1) may determine the motion of the electronic device 200 and/or the user's motion using information for the electronic device 200 obtained using at least one of a gesture sensor, a gyro sensor, or an acceleration sensor of the sensor module (e.g., the sensor module 176 of FIG. 1) and the user's action (e.g., approach of the user's body to the electronic device 200) obtained using the first camera module 251. In an embodiment, in addition to the above-described sensor, the electronic device 200 may include a magnetic (geomagnetic) sensor capable of measuring an orientation using a magnetic field and magnetic force lines and/or a hall sensor capable of obtaining motion information (e.g., moving direction or distance) using the strength of a magnetic field. In an embodiment, the processor may determine the motion of the electronic device 200 and/or the user's motion based on information obtained from the magnetic (geomagnetic) sensor and/or the hall sensor, for example.

According to various embodiments (not shown), the electronic device 200 may perform an input function (e.g., a touch and/or pressure sensing function) capable of interacting with the user. In an embodiment, a component which performs a touch and/or pressure sensing function (e.g., a touch sensor and/or a pressure sensor) may be disposed in at least a portion of the wearing member 203, for example. The electronic device 200 may control the virtual image output through the display member 201 based on the information obtained through the components. In an embodiment, a sensor associated with a touch and/or pressure sensing function may be configured in various types, e.g., a resistive type, a capacitive type, an electromagnetic ("EM") type, or an optical type, for example. In an embodiment, the component which performs the touch and/or pressure sensing function may be identical in whole or part to the configuration of the input module 150 of FIG. 1.

According to various embodiments, the electronic device 200 may include a reinforcing member 260 that is disposed in an inner space of the lens frame 202 and formed to have a higher rigidity than that of the lens frame 202.

According to various embodiments, the electronic device 200 may include a lens structure 270. The lens structure 270 may refract at least a portion of light. In an embodiment, the lens structure 270 may be a prescription lens having a predesignated refractive power, for example. In an embodiment, the lens structure 270 may be disposed behind (e.g., +Y direction) the second window member of the display member 201. In an embodiment, the lens structure 270 may be disposed between the display member 201 and the user's eye, for example. In an embodiment, the lens structure 270 may face one surface of the display member, for example.

According to various embodiments, the housing 210 may include a hinge cover 227 that may conceal a portion of the hinge structure 229. Another part of the hinge structure 229 may be received or hidden between an inner case 231 and an outer case 233, which are described below.

According to various embodiments, the wearing member 203 may include the inner case 231 and the outer case 233. The inner case 231 may be, e.g., a case which faces the user's body or directly contact the user's body, and may include a material having low thermal conductivity, e.g., a synthetic resin. In an embodiment, the inner case 231 may include an inner side surface (e.g., the inner side surface 231*c* of FIG. 2) facing the user's body. The outer case 233 may include, e.g., a material (e.g., a metal) capable of at least partially transferring heat and may be coupled to the inner case 231 to face each other. In an embodiment, the outer case 233 may include an outer side surface (e.g., the outer side surface 231*d* of FIG. 2) opposite to the inner side surface 231*c*. In an embodiment, at least one of the circuit board 241 or the speaker module 245 may be received in a space separated from the battery 243 in the wearing member 203. In the illustrated embodiment, the inner case 231 may include a first case 231*a* including the circuit board 241 or the speaker module 245 and a second case 231*b* receiving the battery 243, and the outer case 233 may include a third case 233*a* coupled to face the first case 231*a* and a fourth case 233*b* coupled to face the second case 231*b*. In an embodiment, the first case 231*a* and the third case 233*a* may be coupled (hereinafter, 'first case portions 231*a* and 233*a*') to receive the circuit board 241 and/or the speaker module 245, and the second case 231*b* and the fourth case 233*b* may be coupled (hereinafter, 'second case portions 231*b* and 233*b*') to receive the battery 343, for example.

According to various embodiments, the first case portions 231*a* and 233*a* may be rotatably coupled to the lens frame 202 through the hinge structure 229, and the second case portions 231*b* and 233*b* may be connected or disposed (e.g., mounted) to the ends of the first case portions 231*a* and 233*a* through the connecting member 235. In some embodiments, a portion of the connecting member 235 in contact with the user's body may include a material having low thermal conductivity, e.g., an elastic material, such as silicone, polyurethane, or rubber, and another portion thereof which does not contact the user's body may include a material having high thermal conductivity (e.g., a metal). In an embodiment, when heat is generated from the circuit board 241 or the battery 243, the connecting member 235 may block heat transfer to the portion in contact with the user's body while dissipating or discharging heat through the portion not in contact with the user's body. In an embodiment, a portion of the connecting member 235 which contacts the user's body may be interpreted as a portion of the inner case 231, and a portion of the connecting member 235 that does not contact the user's body may be interpreted as a portion of the outer case 233. In an embodiment (not shown), the first case 231*a* and the second case 231*b* may be unitary as one body without the connecting member 235, and the third case 233*a* and the fourth case 233*b* may be unitary as one body without the connecting member 235. According to various embodiments, other components (e.g., the antenna module 197 of FIG. 1) may be further included in addition to the illustrated components, and information regarding an object or environment may be received from an external electronic device (e.g., the electronic device 102 or 104 or server 108 of FIG. 1) through a network (e.g., the first network 198 or second network 199 of FIG. 1) using the communication module 190.

Although only the wearable electronic device 200 is illustrated and described in FIGS. 2 to 4, the invention is not limited thereto, and some components of the wearable electronic device 200 illustrated in FIGS. 2 to 4 may be included in electronic devices, such as smartphones and tablet personal computers ("PCs").

Figure 5:
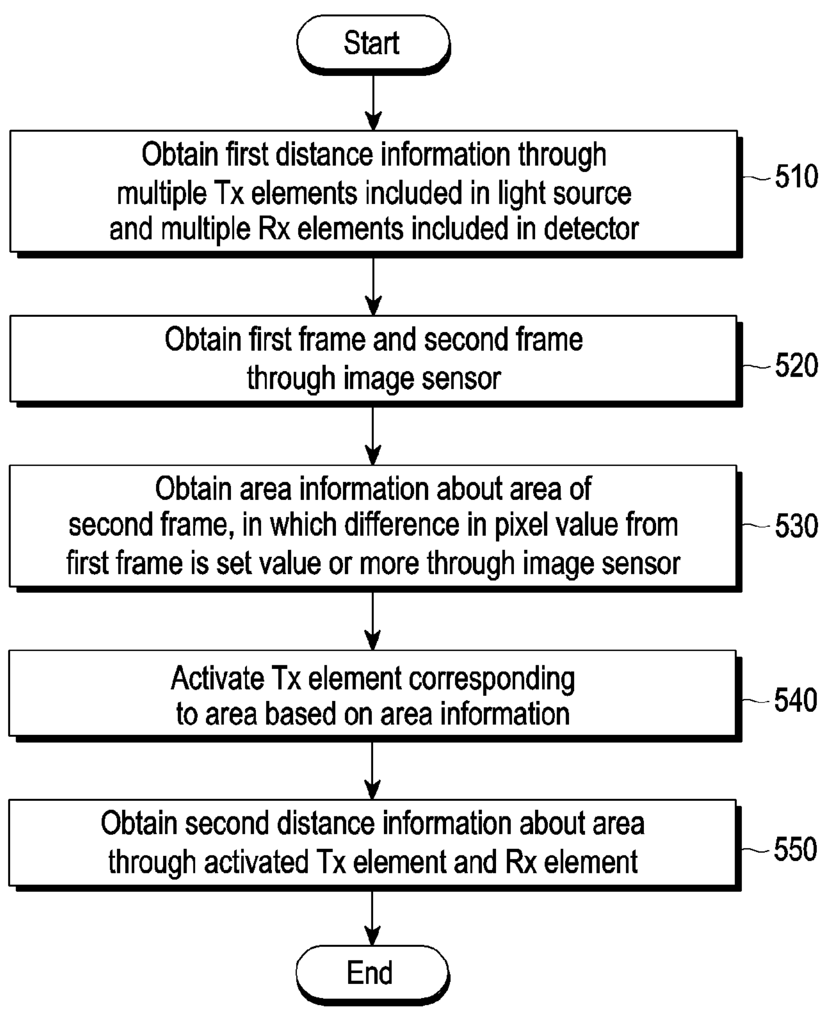
FIG. 5 is a flowchart illustrating an embodiment of an operation for obtaining distance information by an electronic device according to the disclosure.

FIG. 5 is a flowchart illustrating an embodiment of an operation for obtaining distance information by an electronic device according to the disclosure.

Figure 6:
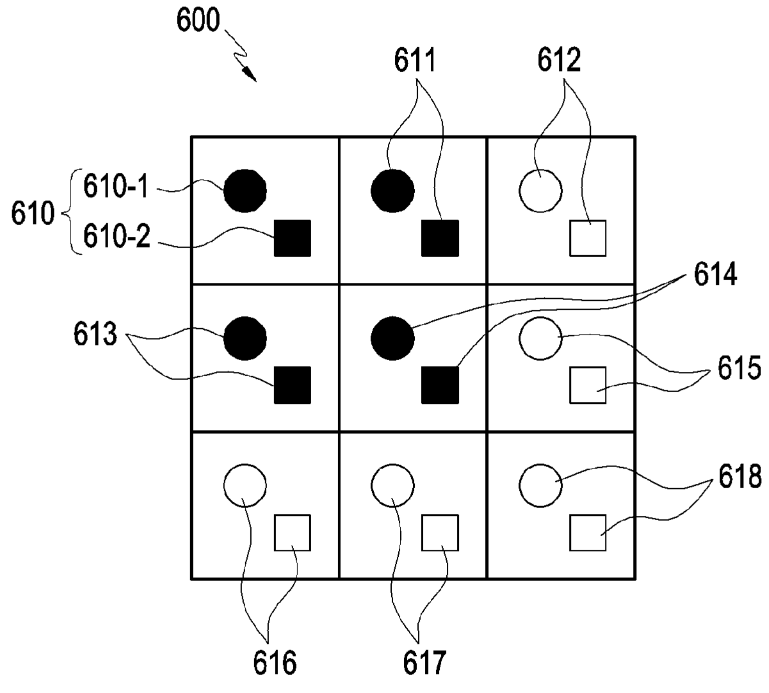
FIG. 6 is a view illustrating an embodiment of an array type of an element group according to the disclosure.

In an embodiment, referring to FIG. 5, in operation 510, an electronic device (e.g., the electronic device 101 of FIG. 1 or the processor 120 of FIG. 1) may obtain distance information through a LiDAR sensor (e.g., the sensor module 176 of FIG. 1, the third camera module 255 of FIG. 3, or the LiDAR sensor 600 of FIG. 6). In an embodiment, the LiDAR sensor may obtain first distance information through a plurality of light transmission elements (e.g., the Tx element 610-1 of FIG. 6) (hereinafter, also referred to as a 'Tx' element) included in the light transmission module (e.g., the sensor module 176 of FIG. 1, the third camera module 255 of FIG. 3, or the LiDAR sensor 600 of FIG. 6) (hereinafter, also referred to as a 'light source') and a plurality of light reception elements (e.g., the Rx element 610-2 of FIG. 6) (hereinafter, also referred to as an 'Rx element') included in the light reception module (e.g., the sensor module 176 of FIG. 1, the third camera module 255 of FIG. 3, or the LiDAR sensor 600 of FIG. 6) (hereinafter, also referred to as a 'detector').

In an embodiment, the plurality of Tx elements may correspond to the plurality of Rx elements, respectively.

In an embodiment, the electronic device may activate the plurality of Tx elements included in the light source and/or the plurality of Rx elements included in the detector.

In an embodiment, the electronic device may output light for obtaining distance information through the plurality of Tx elements and may receive the light into which the output light is reflected by the object through the plurality of Rx elements respectively corresponding to the plurality of Tx elements outputting the light. In an embodiment, the electronic device may obtain distance information between the electronic device and the object based on the time desired from the output of the light to the reception of the reflected light.

In an embodiment, in operation 520, the electronic device may obtain a first frame and a second frame through an image sensor (e.g., the camera module 180 of FIG. 1 or the second camera module 253 of FIG. 3) (hereinafter, also referred to as a 'camera'). In an embodiment, the first frame and the second frame may be image frames, for example.

In an embodiment, the electronic device may obtain the first frame through at least one camera (e.g., the camera module 180 of FIG. 1 or the second camera module 253 of FIG. 3) while obtaining the first distance information through the light source (e.g., the sensor module 176 of FIG. 1, the camera module 180 of FIG. 1, or the third camera module 255 of FIG. 3) and the detector (e.g., the sensor module 176 of FIG. 1, the camera module 180 of FIG. 1, or the third camera module 255 of FIG. 3). In an embodiment, the electronic device may obtain the first frame through at least one camera while substantially simultaneously obtaining the first distance information through the light source and the detector, for example. In an embodiment, the electronic device may map the first distance information to the distance information about the first frame and store it in a memory (e.g., the memory 130 of FIG. 1).

In an embodiment, the electronic device may obtain the second frame after obtaining the first frame through the image sensor.

In an embodiment, in operation 530, the electronic device may obtain area information about an area of the second frame in which the difference in pixel value from the first frame is equal to or larger than a set value through the image sensor. In an embodiment, the electronic device may store pixel values included in the first frame obtained through the image sensor in the memory and may obtain the second frame through the image sensor, for example. In an embodiment, the electronic device may obtain, for each pixel, a difference between the pixel value of the pixel included in the second frame and the pixel value of the pixel included in the stored first frame through the image sensor and may obtain area information related to the area including pixels in which the difference in pixel value is equal to or larger than a set value, for example. In an embodiment, the area information may include position information about the pixel in which the difference between pixel values in the first frame and the second frame is equal to or larger than the set value, for example. In an embodiment, the area where the difference in pixel value is larger than or equal to the set value may be an area where there is a movement of the object, and the area where the pixel value is less than the set value may be an area where there is no movement of the object.

In an embodiment, the difference in pixel value when there is no movement of the object is described below with reference to FIGS. 7(*a*) to 7(*d*), and the difference in pixel value when there is a movement of the object is described below with reference to FIGS. 8(*a*) to 8(*d*).

In an embodiment, in operation 540, the electronic device may activate the Tx element corresponding to the area based on area information. In an embodiment, the electronic device may activate only the Tx elements corresponding to the area identified as having a movement, or may activate the Tx elements corresponding to the identified area and the Rx elements corresponding to the identified area.

In an embodiment, the light source may include a plurality of Tx elements. In an embodiment, the detector may include a plurality of Rx elements respectively corresponding to the plurality of Tx elements. In an embodiment, the plurality of Tx elements and the plurality of Rx elements may be configured as a plurality of element groups including one or more Tx elements and one or more Rx elements corresponding to the one or more Tx elements. In an embodiment, the plurality of element groups may be disposed in a lattice form. In an embodiment, the plurality of element groups disposed in the lattice form may respectively correspond to a plurality of areas in a lattice form. In an embodiment, an array form of a plurality of element groups is described below with reference to FIG. 6.

In an embodiment, the electronic device may control one or more Tx elements and/or one or more Rx elements included in each element group through the plurality of element groups.

In an embodiment, the electronic device may activate one or more Tx elements and/or one or more Rx elements included in at least one or more element groups through an element group corresponding to an area in which there is a movement, for example. In an embodiment, the electronic device may inactivate one or more Tx elements and one or more Rx elements included in the element group corresponding to an area other than the area in which there is a movement.

In an embodiment, in operation 550, the electronic device may obtain second distance information about the area through the activated Tx element and at least one of the plurality of Rx elements. In an embodiment, the electronic device may activate one or more Tx elements included in the element group corresponding to the area in which there is a movement and receive the reflected light of the output light through the plurality of Rx elements operated passively, for example. In an embodiment, the electronic device may obtain the second distance information about the area in which there is a movement based on the time desired from the output of light to the reception of the reflected light.

In an embodiment, upon activating the Tx element corresponding to the area in which there is a movement and the Rx element corresponding to the area in which there is a movement, the electronic device may activate one or more Tx elements included in the element group corresponding to the area in which there is a movement to output light and may activate one or more Rx elements included in the element group corresponding to the area in which there is a movement to receive the reflected light of the output light.

In an embodiment, the electronic device may use second distance information as the distance information about the area in which there is a movement and use the first distance information as the distance information about the area other than the area in which there is a movement.

In an embodiment, the electronic device may update the distance information corresponding to the area in which there is a movement among the first distance information stored in the memory, with the second distance information, for example. In an embodiment, the operation of obtaining new distance information only for the area in which there is a movement and merging it with existing distance information is described below with reference to FIGS. 9(*a*) to 9(*c*).

In an embodiment, the electronic device may store the updated distance information, as the distance information corresponding to the second frame, in the memory. In an embodiment, the electronic device may update the distance information about the area in which there is a movement among the first distance information corresponding to the first frame stored in the memory with the second distance information and map the updated distance information to the distance information about the second frame and store them, for example.

In an embodiment, upon failing to obtain distance information about the area in which there is a movement through the activated Tx element and activated Rx element, the electronic device may obtain distance information about the area in which there is a movement, corresponding to the number of cameras included in the electronic device.

In an embodiment, when including one camera, and when failing to obtain the second distance information about the area in which there is a movement through the activated Rx element, the electronic device may increase the power of the activated Tx element. Thus, the electronic device may obtain the distance information about the object disposed at a distance larger than the existing measurable distance.

In an embodiment, when including one camera, and when failing to obtain the second distance information about the area in which there is a movement through the activated Tx element and the activated Rx element, the electronic device may increase the pulse interval between the activated Tx elements. Thus, the electronic device may obtain the distance information about the object disposed at a distance larger than the existing measurable distance.

In an embodiment, operations when failing to obtain the second distance information about the area in which there is a movement when there is one camera are described below with reference to FIGS. 10A and 10B.

In an embodiment, when including two cameras, and when failing to obtain the second distance information about the area in which there is a movement through the activated Tx element and activated Rx element, the electronic device may obtain third distance information based on the disparity of the two frames obtained through two of two or more cameras. In an embodiment, upon failing to obtain the second distance information, when obtaining the second frame by one camera, the electronic device may obtain the third distance information based on the disparity between the frame simultaneously obtained by another camera and stored in the memory and the second frame. In an embodiment, after failing to obtain the second distance information, the electronic device may simultaneously obtain a third frame and a fourth frame through two cameras and obtain the third distance information based on the disparity of the third frame and the fourth frame. In an embodiment, the disparity is one generated due to a difference in position between the two cameras and may mean a difference in position between the same objects included in the frames respectively obtained by the two cameras. In an embodiment, the disparity may be the distance in coordinates for the same object included in each frame, for example.

In an embodiment, when the distance between the object and the electronic device is short, the difference between the position of the object included in the third frame obtained through the first camera and the position of the same object included in the fourth frame obtained through the second camera may be larger and, when the distance between the object and the electronic device is large, the distance between the position of the object included in the third frame obtained through the first camera and the position of the same object included in the fourth frame obtained through the second camera is small, so that the electronic device may obtain distance information about the object based on the difference in position between the same objects included in the two frames.

In an embodiment, upon obtaining the third distance information based on the disparity based on the third frame and fourth frame, the electronic device may update the first distance information stored in the memory with the third distance information. In an embodiment, since the third distance information obtained through the disparity is the distance information about the entire frame, the electronic device may update the first distance information with the third distance information and map the third distance information to the distance information about the second frame and store them, for example.

In an embodiment, operations when failing to obtain the second distance information about the area in which there is a movement when there are two or more cameras are described below with reference to FIGS. 11A and 11B.

FIG. 6 is a view illustrating an embodiment of an array type of an element group according to the disclosure.

In an embodiment, referring to FIG. 6, a LiDAR sensor 600 (e.g., the sensor module 176 of FIG. 1 or the third camera module 255 of FIG. 3) may include a light source (e.g., the sensor module 176 of FIG. 1 or the third camera module 255 of FIG. 3) and a detector (e.g., the sensor module 176 of FIG. 1 or the third camera module 255 of FIG. 3). In an embodiment, the light source and the detector may include a plurality of element groups 610, 611, 612, 613, 614, 615, 616, 617, and 618. The plurality of element groups 610, 611, 612, 613, 614, 615, 616, 617, and 618 may be disposed in a lattice form.

In an embodiment, each of the plurality of element groups 610, 611, 612, 613, 614, 615, 616, 617, and 618 may include one or more Tx elements and one or more Rx elements corresponding to the one or more Tx elements. In an embodiment, a first element group 610 of the plurality of element groups 610, 611, 612, 613, 614, 615, 616, 617, and 618 may include at least one Tx element 610-1 and at least one Rx element 610-2. FIG. 6 illustrates that each of the plurality of channel element groups 610, 611, 612, 613, 614, 615, 616, 617, and 618 includes one Tx element and one Rx element, but may include two or more Tx elements and two or more Rx elements, for example.

In an embodiment, a plurality of pixels included in a frame obtained through a camera (e.g., the camera module 180 of FIG. 1) may constitute a plurality of pixel groups. In an embodiment, the plurality of pixel groups may be arrayed in a lattice form. Each pixel group may correspond to each of the plurality of element groups 610, 611, 612, 613, 614, 615, 616, 617, and 618. In an embodiment, a quadrangle in which each of the plurality of element groups 610, 611, 612, 613, 614, 615, 616, 617, and 618 is disposed may correspond to each of the plurality of pixel groups, for example.

In an embodiment, the electronic device (e.g., the electronic device 101 of FIG. 1 or the processor 120 of FIG. 1) may activate one or more Tx elements and one or more Rx elements included in at least one or more element groups related to the area in which there is a movement and the difference in pixel value between the first frame and the second frame is a set value or more. In an embodiment, as illustrated in FIG. 6, the electronic device may activate only four element groups 610, 611, 613, and 614 related to the movement area among the nine element groups and inactivate the other element groups 612, 615, 616, 617, and 618, for example.

In an embodiment, the electronic device may obtain new distance information about the area in which there is a movement through one or more Tx elements and one or more Rx elements activated and update the existing distance information about the area in which there is a movement with the new distance information.

As described above, according to various embodiments of the disclosure, as only the Tx elements and Rx elements in the area in which there is a movement are activated to obtain new distance information, power consumption may be reduced.

Figure 7:
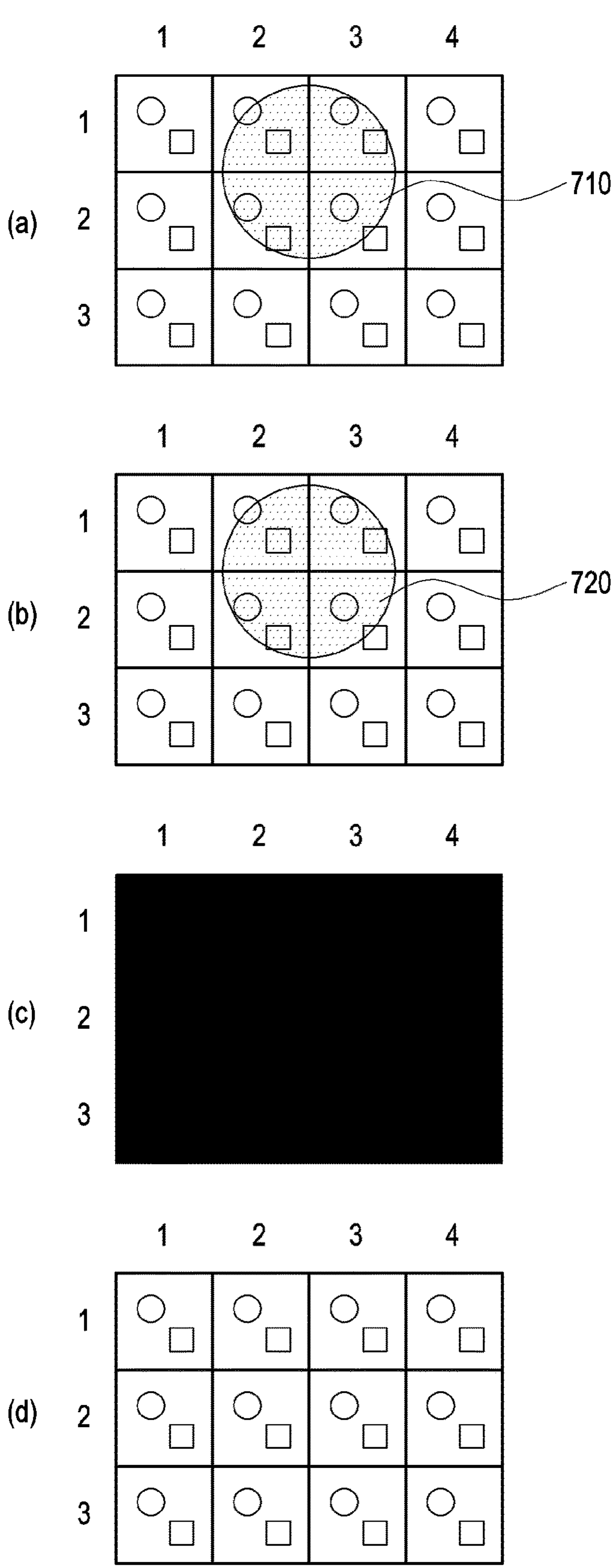
FIGS. 7(*a*) to 7(*d*) are views illustrating an embodiment of a difference in pixel value between frames according to the disclosure.

FIGS. 7(*a*) to 7(*d*) are views illustrating an embodiment of a difference in pixel value between frames according to the disclosure. FIGS. 7(*a*) to 7(*d*) are views illustrating the difference in pixel value when there is no movement of the object in the frame, for example. In an embodiment, the lattice shown in FIGS. 7(*a*) to 7(*d*) means a group of pixels but not shown in the frame, and each group of pixels corresponds to an element group. Each element group may include one or more Tx elements and Rx elements. In an embodiment, the frame is the field of view ("FOV") obtained through a camera (e.g., the camera module 180 of FIG. 1 or the second camera module 253 of FIG. 3), and the distance information about the area corresponding to at least a partial area of the frame may be obtained through the LiDAR sensor (e.g., the sensor module 176 of FIG. 1, the third camera module 255 of FIG. 3, or the LiDAR sensor 600 of FIG. 6).

In an embodiment, when the position of the object 710 in the first frame shown in FIG. 7(*a*) is identical to the position of the object 720 in the second frame shown in FIG. 7(*b*), the difference between the pixel value of the first frame and the pixel value of the second frame may be 0 as shown in FIG. 7(*c*). In an embodiment, the difference in pixel value over the entire frame may be 0, for example. In an embodiment, the electronic device may detect a three-dimensional change of the first frame and the second frame. In an embodiment, when the size of the object is changed, it may be detected that a change occurs in the pixels including the object, for example.

In an embodiment, when the difference between the pixel value of the first frame and the pixel value of the second frame is 0, the electronic device may identify that there is no movement of the object in the frame.

In an embodiment, as shown in FIG. 7(*d*), the electronic device (e.g., the electronic device 101 of FIG. 1) may inactivate the Tx elements (e.g., the Tx element 610-1 of the element group 610 of FIG. 6) and Rx elements (e.g., the Rx element 610-2 of the element group 610 of FIG. 6) of all the element groups based on the difference between the pixel value of the first frame and the pixel value of the second frame being 0.

Figure 8:
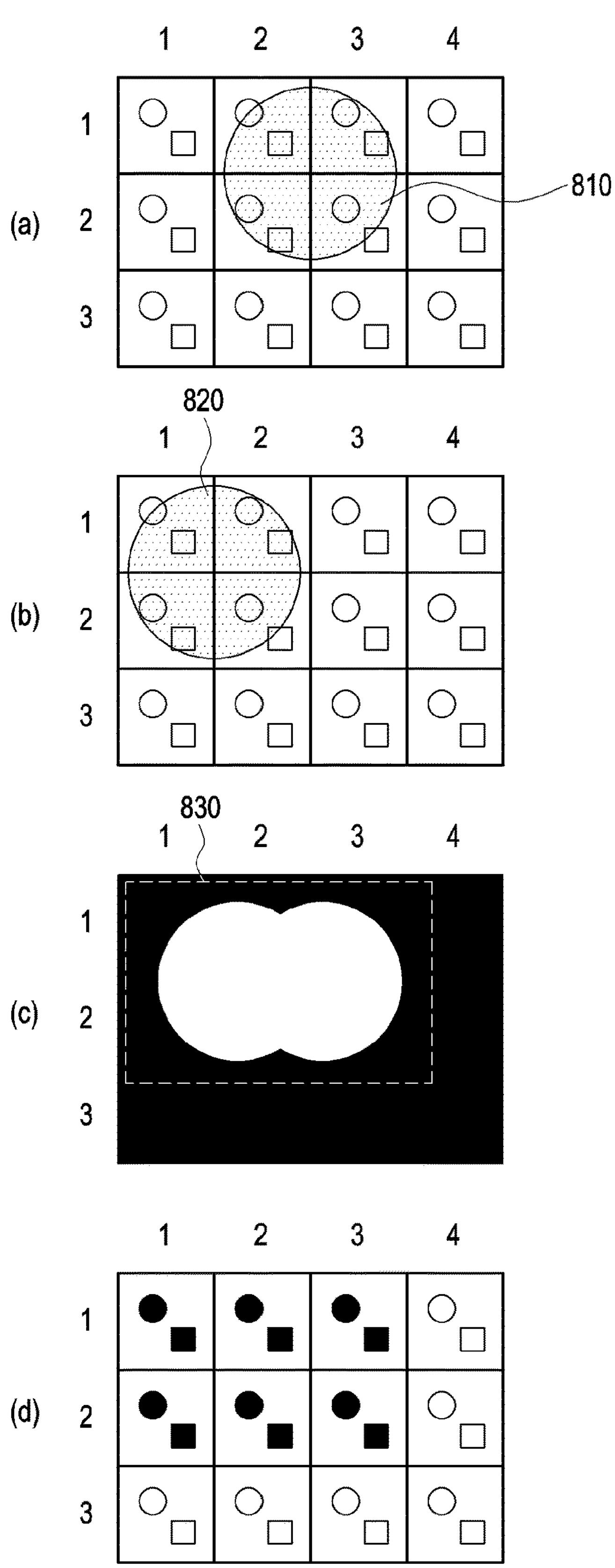
FIGS. 8(*a*) to 8(*d*) are views illustrating an embodiment of a difference in pixel value between frames according to the disclosure.

FIGS. 8(*a*) to 8(*d*) are views illustrating an embodiment of a difference in pixel value between frames according to the disclosure. In an embodiment, FIGS. 8(*a*) to 8(*d*) are views illustrating the difference in pixel value when there is a movement of the object in the frame, for example. In an embodiment, the lattice shown in FIGS. 8(*a*) to 8(*d*) means a group of pixels but not shown in the frame, and each group of pixels corresponds to an element group. Each element group may include one or more Tx elements and Rx elements. In an embodiment, the frame is the FOV obtained through a camera (e.g., the camera module 180 of FIG. 1 or the second camera module 253 of FIG. 3), and the distance information about the area corresponding to at least a partial area of the frame may be obtained through the LiDAR sensor (e.g., the sensor module 176 of FIG. 1, the third camera module 255 of FIG. 3, or the LiDAR sensor 600 of FIG. 6).

In an embodiment, the object 810 in the first frame shown in FIG. 8(*a*) may be disposed over the areas (e.g., (1,2), (1,3), (2,2) and (2,3) areas) from the first row-second column area to the second row-third column area. In an embodiment, as shown in FIG. 8(*b*), the position of the object 820 in the second frame is moved to the left by one column from the position of the object 810 in the first frame and may thus be disposed over the areas (e.g., (1,1), (1,2), (2,1), and (2,2) areas) from the first row-first column area to the second row-second column area.

In an embodiment, the electronic device (e.g., the electronic device 101 of FIG. 1 or the processor 120 of FIG. 1) may obtain the difference between the pixel value of the first frame shown in FIG. 8(*a*) and the pixel value of the second frame shown in FIG. 8(*b*), as shown in FIG. 8(*c*).

In an embodiment, referring to FIG. 8(*c*), the dark area may be an area where the first frame and the second frame have the same pixel value, and the white area may be an area where the difference in pixel value between the first frame and the second frame is a set value or more. In an embodiment, the electronic device may identify the area in which the difference between the pixel value of the first frame and the pixel value of the second frame is the set value or more, as the area 830 in which there is a movement.

In an embodiment, when the object moves, the difference in pixel value in the boundary area of the object would be large, so that the electronic device may identify it the area 830 in which there is a movement, with the area in which the difference between the pixel value of the first frame and the pixel value of the second frame is the set value or more taken as the boundary.

In an embodiment, assuming that the objects 810 and 820 in the frames include one pixel value, as shown in FIG. 8(*c*), the area in which the object 810 in the first frame does not overlap the object 820 in the second frame is shown as a white area, and the area in which the object 810 in the first frame overlaps the object 820 in the second frame is shown as a dark area. However, when the plurality of pixel values included in the object include several pixel values, the area 830 in which there is a movement may include a plurality of pixel values.

In an embodiment, as shown in FIG. 8(*d*), the electronic device may activate the Tx element (e.g., the Tx element 610-1 of FIG. 6) and Rx element (e.g., the Rx element 610-2 of FIG. 6) of the element group corresponding to the area 830 in which there is a movement and the difference between the pixel value of the first frame and the pixel value of the second frame is the set value or more. In an embodiment, the electronic device may activate the Tx element and Rx element of the element group corresponding to the areas (e.g., (1,1), (1,2), (1,3), (2,1), (2,2), and (2,3) areas) from the first row-first column area to the second row-third column area, for example.

Figure 9:
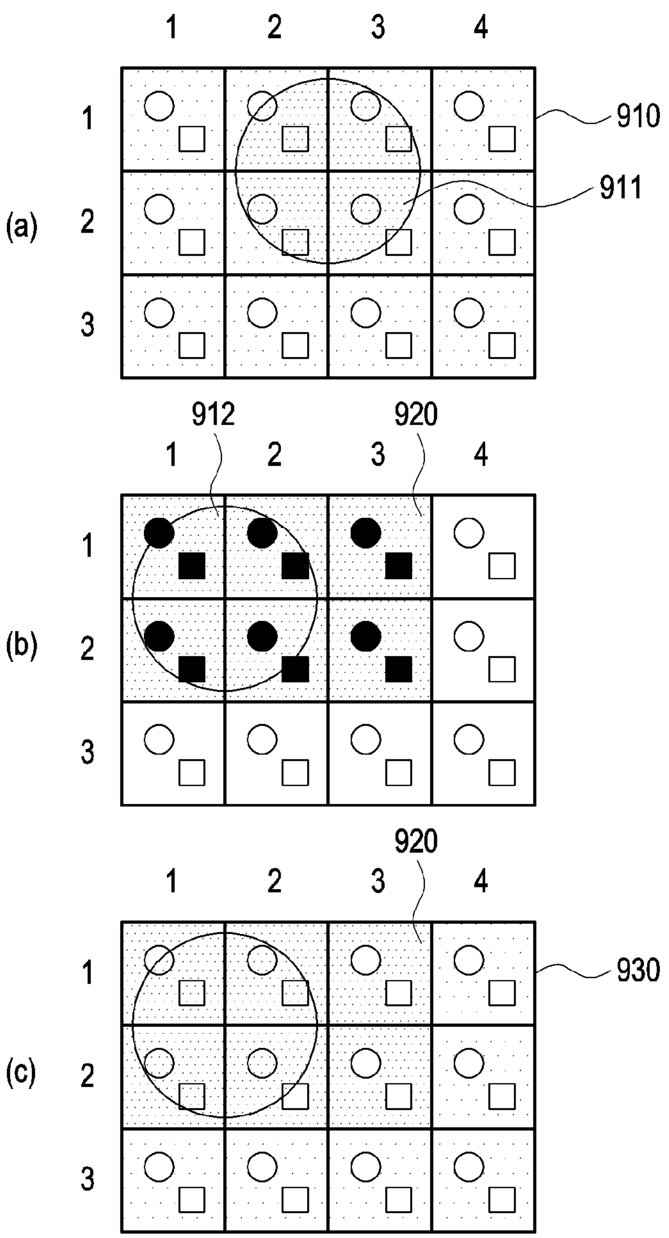
FIGS. 9(*a*) to 9(*c*) are views illustrating an embodiment of an operation for obtaining distance information of a movement area according to the disclosure.

FIGS. 9(*a*) to 9(*c*) are views illustrating an embodiment of an operation for obtaining distance information of a movement area according to the disclosure. In an embodiment, FIGS. 9(*a*) to 9(*c*) are views illustrating the difference in pixel value when there is a movement of the object in the frame, for example. In an embodiment, the lattice shown in FIGS. 9(*a*) to 9(*c*) means a group of pixels but not shown in the frame, and each group of pixels corresponds to an element group. Each element group may include one or more Tx elements and Rx elements. In an embodiment, the frame is the FOV obtained through a camera (e.g., the camera module 180 of FIG. 1 or the second camera module 253 of FIG. 3), and the distance information about the area corresponding to at least a partial area of the frame may be obtained through the LiDAR sensor (e.g., the sensor module 176 of FIG. 1, the third camera module 255 of FIG. 3, or the LiDAR sensor 600 of FIG. 6).

In an embodiment, referring to FIG. 9(*a*), the electronic device (e.g., the electronic device 101 of FIG. 1 or the processor 120 of FIG. 1) may obtain first distance information about an entirety of an area 910 including an object 911. In an embodiment, when activating the plurality of Tx elements and the plurality of Rx elements to obtain the first distance information about the entirety of the area 910 while obtaining the first frame through the camera (e.g., the camera module 180 of FIG. 1), the electronic device may store the first distance information about the entirety of the area 910, as distance information, in the memory (e.g., the memory 130 of FIG. 1), for example.

In an embodiment, the distance of the area where the object is disposed may be shorter than the distance of the area other than the area where the object is disposed.

In an embodiment, referring to FIG. 9(*b*), the electronic device may obtain the second frame through the camera. In an embodiment, in the second frame, the position of the object 912 may have been moved one column left from the position of the object 911 shown in FIG. 9(*a*).

In an embodiment, the electronic device may obtain an area 920 in which the difference between the pixel value of the first frame and the pixel value of the second frame is a set value or more. In an embodiment, the area 920 in which the difference between the pixel value of the first frame and the pixel value of the second frame is the set value or more may be area in which there is a movement of the object. In an embodiment, the area 920 in which the difference between the pixel value of the first frame and the pixel value of the second frame is the set value or more may be an area constituted of pixels in which the difference between the pixel value of the first frame and the pixel value of the second frame is the set value or more according to a movement of the object and may include an area where the object was disposed before but, as the object moves, the object has disappeared and an area where the object is redisposed as the object moves, for example.

In an embodiment, the electronic device may activate the Tx elements and Rx elements included in the plurality of element groups through the plurality of element groups related to the area 920 (e.g., (1,1), (1,2), (1,3), (2,1), (2,2), and (2,3) areas) from the first row-first column area to the second row-third column area, in which the difference between the pixel value of the first frame and the pixel value of the second frame is the set value or more and obtain the second distance information about the area 920 through the activated Tx element and Rx element.

In an embodiment, the electronic device may obtain the distance information about the entirety of the area 930 using the second distance information for the area 920 and the first distance information shown in FIG. 9(*a*) for the other area than the area 920, as shown in FIG. 9(*c*). In an embodiment, the electronic device may update the distance information about the area 920 among the first distance information shown in FIG. 9(*a*) with the second distance information, for example.

Figure 10A:
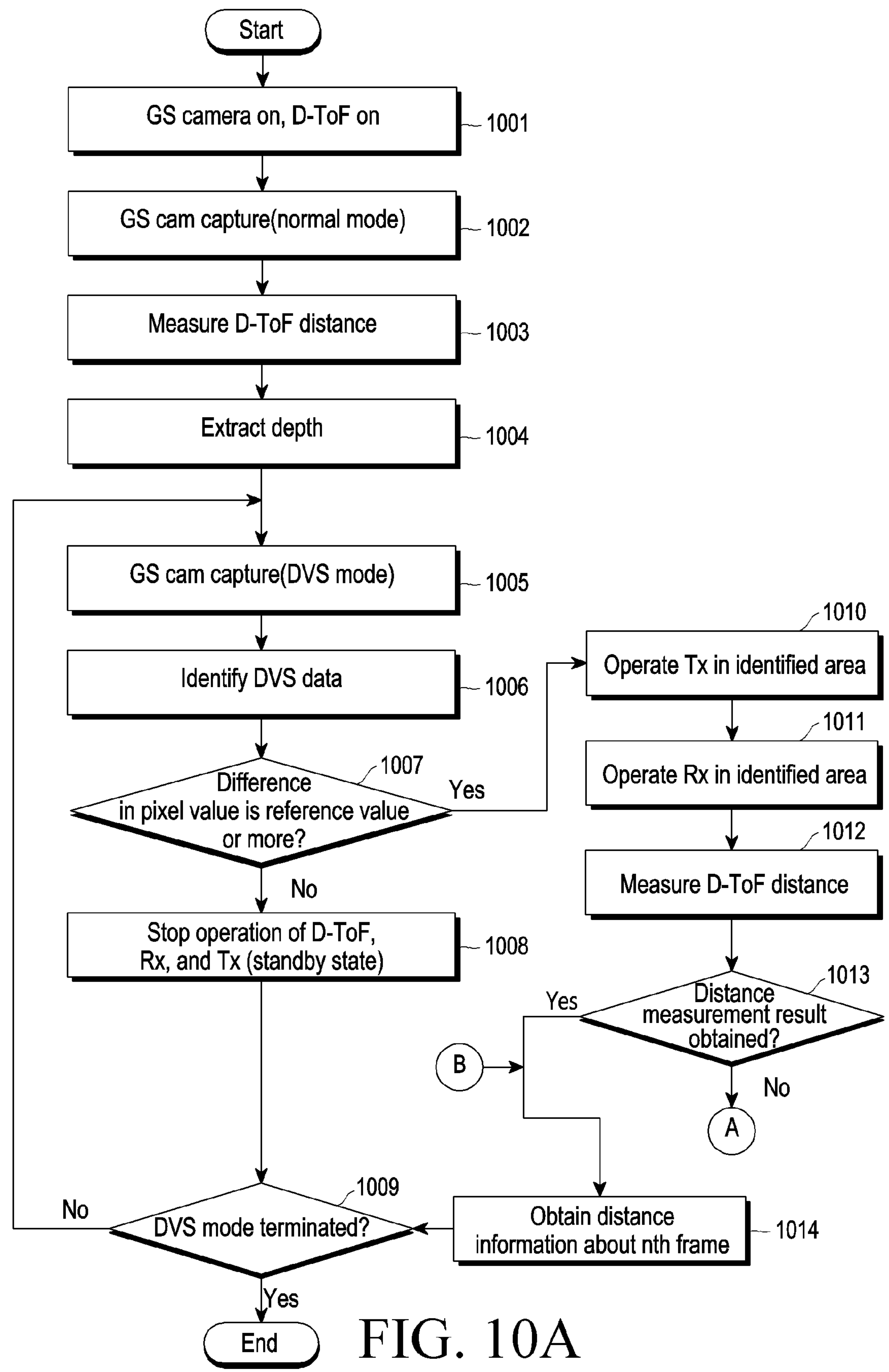
FIG. 10A is a flowchart illustrating an embodiment of an operation for obtaining distance information when there is one camera according to the disclosure.

FIG. 10A is a flowchart illustrating an embodiment of an operation for obtaining distance information when there is one camera according to the disclosure.

In an embodiment, referring to FIG. 10A, in operation 1001, the electronic device (e.g., the electronic device 101 of FIG. 1 or the processor 120 of FIG. 1) may activate (on) a GS camera function and a direct-ToF ("D-ToF") function. In an embodiment, the electronic device may activate a camera for image capturing (e.g., the camera module 180 of FIG. 1) and a sensor capable of obtaining distance information (e.g., the sensor module 176 of FIG. 1) to obtain the GS camera function and D-ToF function, for example.

In an embodiment, in operation 1002, the electronic device may perform a GS camera capture operation of the GS camera function. In an embodiment, the electronic device may obtain an n−1th frame by performing the GS camera capture operation in a normal capture mode, for example.

In an embodiment, in operation 1003, the electronic device may measure the D-ToF distance. In an embodiment, the electronic device may activate all of the plurality of Tx elements included in the light source and the plurality of Rx elements included in the detector to output light for distance measurement and receive the reflected light of the output light, for example. In an embodiment, operations 1002 and 1003 may be performed at substantially the same time.

In an embodiment, in operation 1004, the electronic device may extract distance information (depth). In an embodiment, the electronic device may obtain distance information about the entirety of the area based on the time taken from the output through the plurality of activated Tx elements to the reception of the reflected light through the plurality of activated Rx elements, for example. In an embodiment, the obtained distance information may be distance information corresponding to the entirety of the area of the first frame.

In an embodiment, in operation 1005, the electronic device may perform the GS capture operation. In an embodiment, the electronic device may perform capture in a dynamic vision sensor ("DVS") mode, for example. In an embodiment, the electronic device may perform a capture operation in the DVS mode to determine whether the object moves in the frame. In an embodiment, performing capture in the DVS mode may mean an operation for obtaining a plurality of frames through a continuous capture operation to determine whether the object moves. In an embodiment, operations 1002 and 1005 may be continuous capture operations.

In an embodiment, the electronic device may switch between the normal capture mode and the DVS mode per frame and may perform the capture operation in the normal capture mode for some frames (e.g., frames 1, 3, 5, and 7) and in the DVS mode for some other frames (e.g., frames 2, 4, 6, and 8), so that the normal capture mode and the DVS mode are performed together.

In an embodiment, in operation 1006, the electronic device may identify DVS data. In an embodiment, the electronic device may obtain the difference between the pixel value of the nth frame obtained in operation 1005 and the pixel value of the n-lth frame obtained in operation 1002, as the DVS data, for example.

In an embodiment, in operation 1007, the electronic device may identify whether the difference in pixel value for each pixel is a reference value or more. In an embodiment, when there is no area where the difference in pixel value is the reference value or more (no in operation 1007), the electronic device may switch into the standby state in which the T-DoF and the Rx element and Tx element operations are stopped in operation 1008. When there is no area in which the difference in pixel value is the reference value or more, there is no movement of the object, so that new distance measurement is not desired. Thus, the electronic device may stop operating the T-DoF, Rx element and Tx element.

In an embodiment, in operation 1009, the electronic device may identify whether the DVS mode is terminated. In an embodiment, when the DVS mode is terminated (yes in operation 1009), the electronic device may terminate the distance information acquisition process. In an embodiment, the termination of the DVS mode means that distance measurement is stopped or completed, and the DVS mode may be terminated when the user inputs user manipulation for stopping distance measurement or when there is no movement of the object within a set time or longer, for example.

In an embodiment, unless the DVS mode is terminated (no in operation 1009), the electronic device may return to operation 1005, obtaining the next frame through the GS capture operation. In an embodiment, when there is identified to be no movement of the object so that the T-DoF, Rx element, and Tx element are inactivated, and the DVS mode is identified not to be terminated, the electronic device may repeat the GS operation in the DVS mode of operation 1005, identifying whether the object moves, for example. In an embodiment, upon identifying that the DVS mode is not terminated, the electronic device may perform the operation of obtaining a plurality of frames through the continuous capture operation to periodically determine whether the object moves, for example.

In an embodiment, when there is an area in which the difference in pixel value is the reference value or more (yes in operation 1007), the electronic device may operate the Tx elements corresponding to the area in which the difference in pixel value is identified to be the reference value or more in operation 1010. In an embodiment, the electronic device may activate the plurality of Tx elements included in at least one or more element groups related to the area in which the difference in pixel value is the reference value or more, outputting light for distance measurement, for example.

In an embodiment, in operation 1011, the electronic device may operate the Rx elements in the area in which the difference in pixel value is identified to be the reference value or more. In an embodiment, the electronic device may activate the Rx element corresponding to the activated Tx element, receiving the reflected light of the output light from the Tx element, for example.

In an embodiment, in operation 1012, the electronic device may measure the D-ToF distance for the area in which the difference in pixel value is identified to be the reference value or more. In an embodiment, the electronic device may measure the D-ToF distance for the area in which the difference in pixel value is identified to be the reference value or more based on the time taken from the output of the light from the Tx element to the reception of the reflected light by the Rx element, for example.

In an embodiment, in operation 1013, the electronic device may identify whether a result of distance measurement is obtained. In an embodiment, when the distance from the object in the area in which the difference in pixel value is identified to be the reference value or more is a distance measurable by D-ToF, the electronic device may obtain the result of distance measurement and, when the distance from the object in the area in which the difference in pixel value is identified to be the reference value or more is larger than the distance measurable by D-ToF, the electronic device may fail to obtain the result of distance measurement.

In an embodiment, upon obtaining the distance measurement result (yes in operation 1013), the electronic device may obtain distance information about the nth frame in operation 1014. In an embodiment, the electronic device may obtain the distance information about the nth frame using the distance information obtained in operation 1012 for the area in which the difference in pixel value is identified to be the reference value or more and the distance information obtained in operation 1004 for the other area than the area in which the difference in pixel value is identified to be the reference value or more, for example.

In an embodiment, in operation 1009, the electronic device may identify whether the DVS mode is terminated. In an embodiment, when the DVS mode is terminated (yes in operation 1009), the electronic device may terminate the distance information acquisition process.

In an embodiment, unless the DVS mode is terminated (no in operation 1009), the electronic device may return to operation 1005, obtaining the next frame through the GS capture operation. In an embodiment, the termination of the DVS mode means that distance measurement is stopped or completed, and the DVS mode may be terminated when the user inputs user manipulation for stopping distance measurement or when there is no movement of the object within a set time or longer, for example.

In an embodiment, when the distance measurement result is not obtained (no in operation 1013), the electronic device may proceed to 'A'. The process after 'A' is described below with reference to FIG. 10B.

Figure 10B:
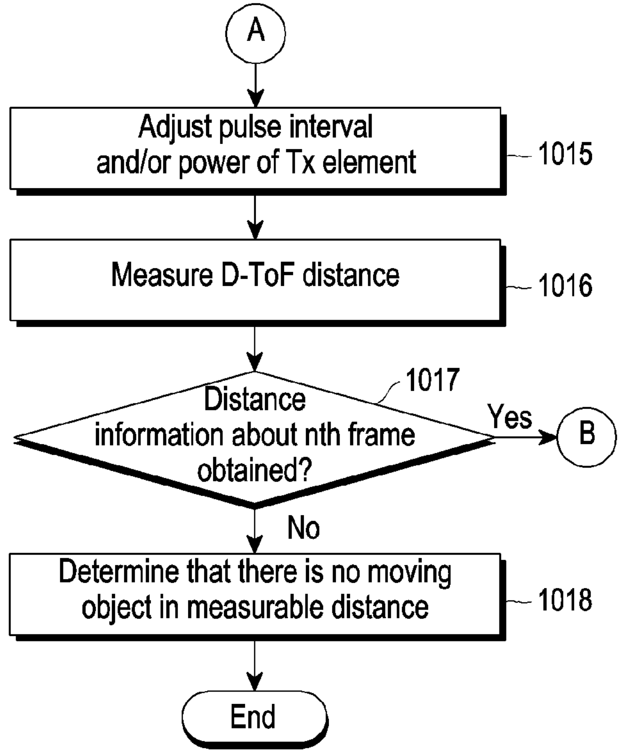
FIG. 10B is a flowchart illustrating an embodiment of an operation for obtaining distance information when there is one camera according to the disclosure.

FIG. 10B is a flowchart illustrating an embodiment of an operation for obtaining distance information when there is one camera according to the disclosure.

In an embodiment, referring to FIG. 10B, in operation 1015 continuing from 'A', the electronic device may adjust the Tx element pulse interval and/or power. In an embodiment, failure to obtain the distance measurement result may come from the object being disposed at a distance larger than the distance measurable distance, for example. The electronic device may increase the pulse interval and/or power of the Tx element to allow the light output from the Tx element to arrive at the larger distance.

In an embodiment, the electronic device may increase the pulse interval and/or power of the Tx element to the maximum or stepwise. In an embodiment, when increasing the pulse interval and/or power of the Tx element stepwise, the electronic device may perform operation 1015 multiple times, for example.

In an embodiment, in operation 1016, the electronic device may measure the D-ToF distance. In an embodiment, the electronic device may measure the D-ToF distance based on the time taken from the output of the light from the Tx element whose pulse interval or power has been increased to the reception of the reflected light by the Rx element, for example.

In an embodiment, in operation 1017, the electronic device may identify whether distance information about the nth frame is obtained. In an embodiment, after adjusting the pulse interval and/or power of the Tx element, when the distance information about the nth frame is obtained (yes in operation 1017), the electronic device may proceed to 'B.' The process after 'B' is described below with reference to FIG. 10A again.

In an embodiment, referring to FIG. 10A, when the distance information about the nth frame is obtained, the electronic device may proceed to operation 1014. In an embodiment, the electronic device may obtain the distance information about the nth frame using the distance information obtained in operation 1017 for the identified area and the distance information obtained in operation 1004 for the other area than the identified area, for example.

In an embodiment, when distance information about the nth frame is not obtained even after adjusting the pulse interval and/or power of the Tx element (no in operation 1017), in operation 1018, the electronic device may determine that there is no moving object in the measurable distance through the DVS mode. In an embodiment, as there is no moving object in the measurable distance, the electronic device may use the distance information obtained in operation 1004 as the distance information about the nth frame.

Figure 11A:
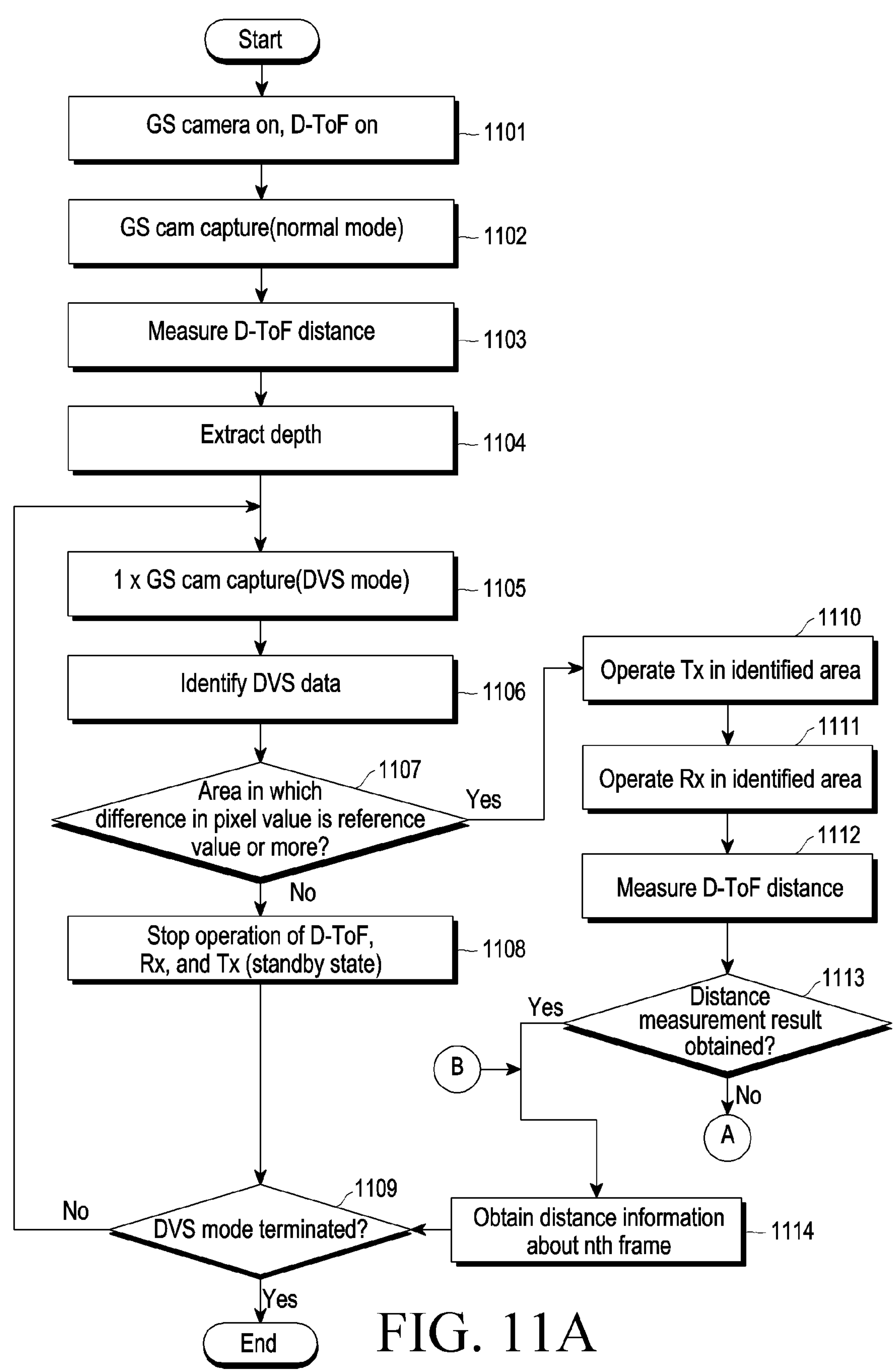
FIG. 11A is a flowchart illustrating an embodiment of an operation for obtaining distance information when there are two cameras according to the disclosure.

FIG. 11A is a flowchart illustrating an embodiment of an operation for obtaining distance information when there are two cameras according to the disclosure.

In an embodiment, referring to FIG. 11A, in operation 1101, the electronic device (e.g., the electronic device 101 of FIG. 1 or the processor 120 of FIG. 1) may activate (on) a GS camera function and a D-ToF function. In an embodiment, the electronic device may activate a camera for image capturing (e.g., the camera module 180 of FIG. 1) and a sensor capable of obtaining distance information (e.g., the sensor module 176 of FIG. 1) to obtain the GS camera function and D-ToF function, for example.

In an embodiment, in operation 1102, the electronic device may perform a GS camera capture operation of the GS camera function. In an embodiment, the electronic device may obtain an n−1th frame by performing the GS camera capture operation in a normal capture mode, for example.

In an embodiment, in operation 1103, the electronic device may measure the D-ToF distance. In an embodiment, the electronic device may activate all of the plurality of Tx elements included in the light source and the plurality of Rx elements included in the detector to output light for distance measurement and receive the reflected light of the output light, for example. In an embodiment, operations 1102 and 1103 may be performed at substantially the same time.

In an embodiment, in operation 1104, the electronic device may extract distance information (depth). In an embodiment, the electronic device may obtain distance information about the entirety of the area based on the time taken from the output through the plurality of activated Tx elements to the reception of the reflected light through the plurality of activated Rx elements, for example. In an embodiment, the obtained distance information may be distance information corresponding to the entirety of the area of the first frame.

In an embodiment, in operation 1105, the electronic device may perform the GS capture operation. In an embodiment, the electronic device may perform capture in the DVS mode using one of two or more GS cameras, for example. In an embodiment, the electronic device may perform a capture operation in the DVS mode to determine whether the object moves in the frame. In an embodiment, performing capture in the DVS mode may mean an operation for obtaining a plurality of frames through a continuous capture operation to determine whether the object moves. In an embodiment, operations 1002 and 1005 may be continuous capture operations.

In an embodiment, the electronic device may switch between the normal capture mode and the DVS mode per frame and may perform the capture operation in the normal capture mode for some frames (e.g., frames 1, 3, 5, and 7) and in the DVS mode for some other frames (e.g., frames 2, 4, 6, and 8), so that the normal capture mode and the DVS mode are performed together.

In an embodiment, in operation 1106, the electronic device may identify DVS data. In an embodiment, the electronic device may obtain the difference between the pixel value of the nth frame obtained in operation 1105 and the pixel value of the n−lth frame obtained in operation 1102, as the DVS data, for example.

In an embodiment, in operation 1107, the electronic device may identify whether there is an area in which the difference in pixel value for each pixel is a reference value or more. In an embodiment, when there is no area where the difference in pixel value is the reference value or more (no in operation 1107), the electronic device may switch into the standby state in which the T-DoF and the Rx element and Tx element operations are stopped in operation 1108. When there is no area in which the difference in pixel value is the reference value or more, there is no movement of the object, so that new distance measurement is not desired. Thus, the electronic device may stop operating the T-DoF, Rx element and Tx element.

In an embodiment, in operation 1109, the electronic device may identify whether the DVS mode is terminated. In an embodiment, when the DVS mode is terminated (yes in operation 1109), the electronic device may terminate the distance information acquisition process. In an embodiment, the termination of the DVS mode means that distance measurement is stopped or completed, and the DVS mode may be terminated when the user inputs user manipulation for stopping distance measurement or when there is no movement of the object within a set time or longer, for example.

In an embodiment, unless the DVS mode is terminated (no in operation 1109), the electronic device may return to operation 1105, obtaining the next frame through the GS capture operation. In an embodiment, when there is identified to be no movement of the object so that the T-DoF, Rx element, and Tx element are inactivated, and the DVS mode is identified not to be terminated, the electronic device may repeat the GS operation in the DVS mode of operation 1105, identifying whether the object moves, for example.

In an embodiment, when there is an area in which the difference in pixel value is the reference value or more (yes in operation 1107), the electronic device may operate the Tx elements corresponding to the identified area in operation 1110. In an embodiment, the electronic device may activate the plurality of Tx elements included in at least one or more element groups related to the area in which the difference in pixel value is the reference value or more, outputting light for distance measurement, for example.

In an embodiment, in operation 1111, the electronic device may operate the Rx elements in the identified area. In an embodiment, the electronic device may activate the Rx element corresponding to the activated Tx element, receiving the reflected light of the output light from the Tx element, for example.

In an embodiment, in operation 1112, the electronic device may measure the D-ToF distance corresponding to the identified area. In an embodiment, the electronic device may measure the D-ToF distance corresponding to the identified area based on the time taken from the output of the light from the Tx element to the reception of the reflected light by the Rx element, for example.

In an embodiment, in operation 1113, the electronic device may identify whether a result of distance measurement is obtained. In an embodiment, when the distance from the object in the identified area is a distance measurable by D-ToF, the electronic device may obtain the result of distance measurement and, when the distance from the object in the identified area is larger than the distance measurable by D-ToF, the electronic device may fail to obtain the result of distance measurement, for example.

In an embodiment, upon obtaining the distance measurement result (yes in operation 1113), the electronic device may obtain distance information about the nth frame in operation 1114. In an embodiment, the electronic device may obtain the distance information about the nth frame using the distance information obtained in operation 1112 for the identified area and the distance information obtained in operation 1104 for the other area than the identified area, for example.

In an embodiment, in operation 1109, the electronic device may identify whether the DVS mode is terminated. In an embodiment, when the DVS mode is terminated (yes in operation 1109), the electronic device may terminate the distance information acquisition process.

In an embodiment, unless the DVS mode is terminated (no in operation 1109), the electronic device may return to operation 1105, obtaining the next frame through the GS capture operation using one of two or more GS cameras. In an embodiment, the termination of the DVS mode means that distance measurement is stopped or completed, and the DVS mode may be terminated when the user inputs user manipulation for stopping distance measurement or when there is no movement of the object within a set time or longer, for example.

In an embodiment, when the distance measurement result is not obtained (no in operation 1113), the electronic device may proceed to 'A.' The process after 'A' is described below with reference to FIG. 11B.

Figure 11B:
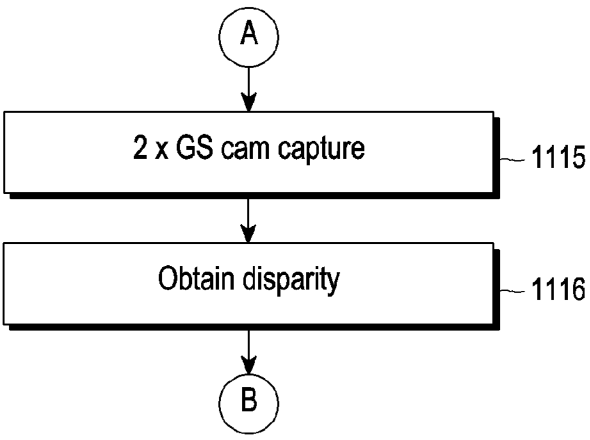
FIG. 11B is a flowchart illustrating an embodiment of an operation for obtaining distance information when there are two cameras according to the disclosure.

FIG. 11B is a flowchart illustrating an embodiment of an operation for obtaining distance information when there are two cameras according to the disclosure.

In an embodiment, referring to FIG. 11B, in operation 1115 continuing from 'A', the electronic device may perform the capture operation using two GS cameras. In an embodiment, when the distance measurement result is not obtained, it may be because the object is disposed at a distance larger than the distance measurable distance, for example. When the electronic device includes two GS cameras, the electronic device may perform the GS camera capture operation in the normal capture mode of the function of the two GS cameras, obtaining the third frame and the fourth frame. FIG. 11B illustrates that when distance information is not obtained in operation 1113, the third frame and the fourth frame are obtained in operation 1115. However, in an embodiment, the frame obtained in operation 1105 of FIG. 11A and the frame obtained simultaneously by another camera when the frame of operation 1105 is obtained may be used.

In an embodiment, FIG. 11B illustrates that when the electronic device includes two GS cameras, the electronic device obtains distance information through the disparity. However, in an embodiment, even when two GS cameras are included, the D-ToF distance corresponding to the identified area may be measured based on the time taken while light is output from the Tx element corresponding to the identified area, and the reflected light is received by the Rx element.

In an embodiment, in operation 1116, the electronic device may obtain the disparity. In an embodiment, the electronic device may obtain the disparity which is the difference in position between the same objects included in two frames, for example. In an embodiment, the electronic device may obtain the third frame and fourth frame through two GS cameras which have failed to obtain distance information in operation 1113 of FIG. 11A and obtain the disparity between the third frame and the fourth frame, for example. In an embodiment, in operation 1105, the electronic device may obtain the disparity based on the second frame obtained in operation 1105 and the frame obtained simultaneously with the second frame. In an embodiment, the electronic device may proceed to 'B' after obtaining the disparity in operation 1116. The process after 'B' is described below with reference to FIG. 11A again.

In an embodiment, referring to FIG. 11A, when the distance information about the nth frame is obtained, the electronic device may proceed to operation 1114.

In an embodiment, the electronic device may obtain distance information about the nth frame based on the disparity between the third frame and the fourth frame, for example. In an embodiment, the electronic device may obtain distance information about the nth frame based on the second frame and the frame obtained simultaneously with the second frame. In an embodiment, the electronic device may obtain the distance between the electronic device and the object based on the difference in position between the same objects in the two frames obtained simultaneously, for example. In an embodiment, the difference in position between the same objects included in the two frames, respectively, may come from the difference between the two cameras having obtained the two frames, for example. The electronic device may obtain the distance between the electronic device and the object based on the distance between the two cameras and the difference between the positions of the pixels (e.g., the distance between the pixels) corresponding to the same obtains included in the two frames, respectively.

In an embodiment, the electronic device may obtain the distance information about the nth frame using the distance information obtained in operation 1114 for the area in which the difference in pixel value is identified to be the reference value or more and the distance information obtained in operation 1104 for the other area than the identified area. In an embodiment, the electronic device may obtain distance information about the entire nth frame based on the disparity obtained in operation 1116 of FIG. 11B.

In an embodiment, an electronic device (e.g., the electronic device 101 of FIG. 1 or the wearable electronic device 200 of FIG. 2) may include an image sensor (e.g., the camera module 180 of FIG. 1 or the second camera module 253 of FIG. 3), a light transmission module (e.g., the sensor module 176 of FIG. 1, the third camera module 255 of FIG. 3, or the LiDAR sensor 600 of FIG. 6) including a plurality of light transmission elements, a detector (e.g., the sensor module 176 of FIG. 1, the third camera module 255 of FIG. 3, or the LiDAR sensor 600 of FIG. 6) including a plurality of Rx elements, and at least one processor (e.g., the processor 120 of FIG. 1) operatively connected with the image sensor, the light transmission module, and the light reception module. The at least one processor may obtain first distance information through the plurality of light transmission elements and the plurality of light reception elements, obtain a first frame and a second frame through the image sensor, obtain area information related to an area of the second frame, in which a difference in pixel value from the first frame is a set value or more, through the image sensor, activate a light transmission element corresponding to the area among the plurality of light transmission elements based on the area information, and obtain second distance information about the area through the activated light transmission element and the plurality of light reception elements.

In an embodiment, the at least one processor may use the second distance information as distance information about the area and use the first distance information as distance information about an area other than the area.

In an embodiment, the at least one processor may activate a light reception element corresponding to the area among the plurality of light reception elements and obtain second distance information about the area through the activated light transmission element and the activated light reception element.

In an embodiment, the electronic device may further include a memory (e.g., the memory 130 of FIG. 1). The image sensor may store a pixel value of each of pixels included in the first frame in the memory, obtain the second frame, obtain, for each of the pixels, a difference between a pixel value of a pixel included in the second frame and the stored pixel value of the pixel included in the first frame, and obtain area information related to the area including a pixel in which the difference is the set value or more.

In an embodiment, the light transmission module and the light reception module may include a plurality of element groups arrayed in a lattice form. Each of the plurality of element groups may include one or more light transmission elements and one or more light reception elements corresponding to the one or more light transmission elements.

In an embodiment, the at least one processor may activate the one or more light transmission elements included in at least one or more element group related to the area.

In an embodiment, the at least one processor may, upon failing to obtain the second distance information about the area through the activated light transmission element and the plurality of light reception elements, increase power of the activated light transmission element.

In an embodiment, the at least one processor may, upon failing to obtain the second distance information about the area through the activated light transmission element and the plurality of light reception elements, increase a pulse interval of the activated light transmission element.

In an embodiment, the image sensor may be provided in plural, and the at least one processor may, upon failing to obtain the second distance information about the area through the activated light transmission element and the plurality of light reception elements, obtain third distance information based on a disparity between a third frame and a fourth frame obtained through two of the plurality of image sensors.

In an embodiment, the electronic device may further include a memory. The at least one processor may update the first distance information stored in the memory with the third distance information.

In an embodiment, a method for controlling an electronic device may include obtaining first distance information through a plurality of light transmission elements included in a light transmission module and a plurality of light reception elements included in a light reception module, obtaining a first frame and a second frame through an image sensor, obtaining area information related to an area of the second frame, in which a difference in pixel value from the first frame is a set value or more, through the image sensor, activating a light transmission element corresponding to the area among the plurality of light transmission elements based on the area information, and obtaining second distance information about the area through the activated light transmission element and the plurality of light reception elements.

In an embodiment, the method may further include using the second distance information as distance information about the area and using the first distance information as distance information about an area other than the area.

In an embodiment, the method may further include activating a light reception element corresponding to the area among the plurality of light reception elements. Obtaining the second distance information about the area may obtain the second distance information about the area through the activated light transmission element and the activated light reception element.

In an embodiment, obtaining the area information related to the area of the second frame, in which the difference in pixel value from the first frame is the set value or more, through the image sensor, may store a pixel value of each of pixels included in the first frame in a memory, obtain the second frame, obtain, for each of the pixels, a difference between a pixel value of a pixel included in the second frame and the stored pixel value of the pixel included in the first frame, and obtain the area information related to the area including a pixel in which the difference is the set value or more.

In an embodiment, the light transmission module and the light reception module may include a plurality of element groups arrayed in a lattice form. Each of the plurality of element groups may include one or more light transmission elements and one or more light reception elements corresponding to the one or more light transmission elements.

In an embodiment, the activating may activate one or more light transmission elements included in at least one or more element group related to the area.

In an embodiment, the method may further include, upon failing to obtain the second distance information about the area through the activated light transmission element and the plurality of light reception elements, increasing power of the activated light transmission element.

In an embodiment, the method may further include, upon failing to obtain the second distance information about the area through the activated light transmission element and the plurality of light reception elements, increasing a pulse interval of the activated light transmission element.

In an embodiment, the image sensor may be provided in plural, and the method may further include, upon failing to obtain the second distance information about the area through the activated light transmission element and the plurality of light reception elements, obtaining third distance information based on a disparity between a third frame and a fourth frame obtained through two of the plurality of image sensors.

In an embodiment, the method may further include updating the first distance information stored in a memory with the third distance information.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

at least one image sensor;

at least one light detection and ranging (LIDAR) sensor, configured to obtain distance information about an area corresponding to at least a partial area of at least one frame obtained through the image sensor, comprising a light transmission module including a plurality of light transmission elements and a light reception module including a plurality of light reception elements, and at least one processor operatively connected with the image sensor, the light transmission module, and the light reception module;

wherein the at least one processor is configured to:

obtain first distance information through the plurality of light transmission elements and the plurality of light reception elements, obtain, through the at least one image sensor, at least one first frame and at least one second frame, wherein the at least one second frame is obtained after obtaining the at least one first frame, obtain, through the at least one image sensor, area information related to an area of the at least one second frame satisfying a specified condition related to a pixel difference between the at least one first frame and the at least one second frame, while the at least one LIDAR sensor is deactivated, based on the area information, activate a light transmission element corresponding to the area among the plurality of light transmission elements and a light reception element corresponding to the area among the plurality of light reception elements, and obtain second distance information about the area by outputting light to the area from the activated light transmission element corresponding to the area and receiving reflected light of the output light from the area by at least one of the plurality of light reception elements.

2. The electronic device of claim 1, wherein the at least one processor is configured to, identify the second distance information as distance information about the area and use the first distance information as distance information about an area other than the area.

3. The electronic device of claim 1, wherein the at least one processor is configured to:

obtain the second distance information about the area through the activated light transmission element and the activated light reception element.

4. The electronic device of claim 1, further comprising a memory, wherein the image sensor is configured to:

store a pixel value of each of pixels included in the at least one first frame in the memory, obtain the at least one second frame, obtain, for each of the pixels, a difference between a pixel included in the at least one second frame among the pixels and the stored pixel value of the pixel included in the at least one first frame, and wherein the specified condition related to a pixel difference includes the difference in pixel value from the at least one first frame and the at least one second frame is a set value or more.

5. The electronic device of claim 1, wherein the light transmission module and the light reception module include a plurality of element groups arrayed in a lattice form, and wherein each of the plurality of element groups includes one or more light transmission elements and one or more light reception elements corresponding to the one or more light transmission elements.

6. The electronic device of claim 5, wherein the at least one processor is configured to, activate the one or more light transmission elements included in at least one or more element group related to the area.

7. The electronic device of claim 1, wherein the at least one processor is configured to increase power of the activated light transmission element based on failing to obtain the second distance information about the area through the activated light transmission element and the at least one of the plurality of light reception elements.

8. The electronic device of claim 1, wherein the at least one processor is configured to increase a pulse interval of the activated light transmission element based on failing to obtain the second distance information about the area through the activated light transmission element and the at least one of the plurality of light reception elements.

9. The electronic device of claim 1, wherein the image sensor is provided in plural, and the at least one processor is configured to obtain third distance information based on a disparity between a third frame and a fourth frame obtained through two of the plurality of image sensors based on failing to obtain the second distance information about the area through the activated light transmission element and the at least one of the plurality of light reception elements.

10. A method for controlling an electronic device, the method comprising:

obtaining first distance information through a plurality of light transmission elements included in a light transmission module and a plurality of light reception elements included in a light reception module, wherein the light transmission module and the light reception module are included in at least one light detection and ranging (LIDAR) sensor configured to obtain distance information about an area corresponding to at least a partial area of at least one frame obtained through at least one image sensor of the electronic device;

obtaining, through the at least one image sensor, at least one first frame and at least one second frame, wherein the at least one second frame is obtained after obtaining the at least one first frame;

obtaining, through the at least one image sensor, area information related to an area of the at least one second frame satisfying a specified condition related to a pixel difference between the at least one first frame and the at least one second frame while the at least one LIDAR sensor is deactivated;

based on the area information, activating a light transmission element corresponding to the area among the plurality of light transmission elements and a light reception element corresponding to the area among the plurality of light reception elements based; and obtaining second distance information about the area by outputting light to the area from the activated light transmission element corresponding to the area and receiving reflected light of the output light from the area by at least one of the plurality of light reception elements.

11. The method of claim 10, further comprising identifying the second distance information as distance information about the area and using the first distance information as distance information about an area other than the area.

12. The method of claim 10, wherein the obtaining the second distance information about the area comprises obtaining the second distance information about the area through the activated light transmission element and the activated light reception element.

13. The method of claim 10, wherein the obtaining the area information related to the area of the at least one second frame, in which the difference in pixel value from the at least one first frame is the set value or more, through the image sensor, comprises:

storing a pixel value of each of pixels included in the at least one first frame in a memory, obtaining the at least one second frame, obtaining, for each of the pixels, a difference between a pixel value of a pixel included in the at least one second frame among the pixels and the stored pixel value of the pixel included in the at least one first frame, and wherein the specified condition related to a pixel difference includes the difference in pixel value from the at least one first frame and the at least one second frame is a set value or more.

14. The method of claim 10, wherein the light transmission module and the light reception module include a plurality of element groups arrayed in a lattice form, and wherein each of the plurality of element groups includes one or more light transmission elements and one or more light reception elements corresponding to the one or more light transmission elements.

15. The method of claim 14, wherein the activating the light transmission element corresponding to the area comprising activating one or more light transmission elements included in at least one or more element group related to the area.

16. The method of claim 10, further comprising, increasing power of the activated light transmission element based on failing to obtain the second distance information about the area through the activated light transmission element and the plurality of light reception elements.

17. The method of claim 10, further comprising, increasing a pulse interval of the activated light transmission element based on failing to obtain the second distance information about the area through the activated light transmission element and the at least one of the plurality of light reception elements.

18. The method of claim 10, wherein the image sensor is provided in plural, and the method further comprises obtaining third distance information based on a disparity between a third frame and a fourth frame obtained through two of the plurality of image sensors based on failing to obtain the second distance information about the area through the activated light transmission element and the at least one of the plurality of light reception elements.

19. The electronic device of claim 1, wherein the at least one second frame is captured in a second capture mode including a dynamic vision sensor ("DVS") mode, and the at least one first frame and the at least one second frame are obtained by the at least one image sensor in an interleaved manner.

20. The method of claim 10, wherein the at least one second frame is captured in a second capture mode including a dynamic vision sensor ("DVS") mode, and the at least one first frame and the at least one second frame are obtained by the at least one image sensor in an interleaved manner.

* * * * *